United States Patent
Park et al.

(10) Patent No.: US 8,855,034 B2
(45) Date of Patent: Oct. 7, 2014

(54) METHOD OF ALLOCATING PAGING CARRIER AND MOBILE STATION

(75) Inventors: Gi Won Park, Anyang-si (KR); Ki Seon Ryu, Anyang-si (KR); Yong Ho Kim, Anyang-si (KR); Young Soo Yuk, Anyang-si (KR); Doo Hyun Sung, Anyang-si (KR); Han Gyu Cho, Anyang-si (KR); Jae Hoon Chung, Anyang-si (KR); Kyu Jin Park, Anyang-si (KR); Eun Jong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 13/124,385

(22) PCT Filed: Oct. 15, 2009

(86) PCT No.: PCT/KR2009/005937
§ 371 (c)(1),
(2), (4) Date: Aug. 16, 2011

(87) PCT Pub. No.: WO2010/044620
PCT Pub. Date: Apr. 22, 2010

(65) Prior Publication Data
US 2011/0292856 A1   Dec. 1, 2011

Related U.S. Application Data

(60) Provisional application No. 61/246,539, filed on Sep. 29, 2009, provisional application No. 61/109,509, filed on Oct. 30, 2008, provisional application No. 61/106,978, filed on Oct. 21, 2008, provisional application No. 61/105,793, filed on Oct. 15, 2008.

(30) Foreign Application Priority Data

Dec. 31, 2008   (KR) .................. 10-2008-0138079

(51) Int. Cl.
*H04W 72/04*   (2009.01)
*H04W 48/12*   (2009.01)
*H04W 60/00*   (2009.01)
*H04W 68/00*   (2009.01)
*H04L 5/00*   (2006.01)

(52) U.S. Cl.
CPC ............ *H04W 68/00* (2013.01); *H04L 5/0053* (2013.01); *H04W 48/12* (2013.01); *H04L 5/00* (2013.01); *H04L 5/0094* (2013.01); *H04W 60/00* (2013.01); *H04L 5/001* (2013.01)
USPC ........................................ 370/311; 370/329

(58) Field of Classification Search
CPC .......... H04W 72/0453; H04W 72/085; H04W 48/12; H04W 4/06; H04W 60/00; H04W 68/00; H04W 68/005; H04W 68/025; H04W 72/005; H04W 72/04; Y02B 60/50
USPC ........................... 370/254–350; 709/201–213
See application file for complete search history.

(56) References Cited

U.S. PATENT DOCUMENTS 8,229,475 B2 *   7/2012   Xu et al. .................... 455/458

(Continued)

FOREIGN PATENT DOCUMENTS

CN               101043733           9/2007

(Continued)

OTHER PUBLICATIONS

The State Intellectual Property Office of the People's Republic of China Application Serial No. 200980145286.X, Office Action dated Jul. 3, 2013 6 pages.

(Continued)

*Primary Examiner* — Ayaz Sheikh
*Assistant Examiner* — Debebe Asefa
(74) *Attorney, Agent, or Firm* — Lee, Hong, Degerman, Kang & Waimey

(57) ABSTRACT

A method of allocating a paging carrier in a multi-carrier environment is disclosed. The method of allocating the paging carrier includes receiving a first message including first allocation information of the paging carrier, transmitting a second message for requesting entry into an idle mode to a base station; and receiving a third message including second allocation information of a changed paging carrier from the base station. At this time, the paging carrier includes a paging channel out of multiple carriers including one or more carriers.

12 Claims, 11 Drawing Sheets

(56) References Cited

U.S. PATENT DOCUMENTS

| | | | |
|---|---|---|---|
| 8,660,589 B2* | 2/2014 | Lim et al. | 455/458 |
| 2003/0088695 A1* | 5/2003 | Kwak et al. | 709/238 |
| 2003/0095513 A1 | 5/2003 | Woodmansee et al. | |
| 2005/0048979 A1 | 3/2005 | Chun et al. | |
| 2006/0116123 A1* | 6/2006 | Purnadi et al. | 455/435.1 |
| 2006/0203766 A1* | 9/2006 | Kim et al. | 370/328 |
| 2007/0055778 A1* | 3/2007 | Park et al. | 709/226 |

FOREIGN PATENT DOCUMENTS

| | | |
|---|---|---|
| CN | 101091410 | 12/2007 |
| JP | 2007-221753 | 8/2007 |
| KR | 10-2005-0023702 | 3/2005 |
| KR | 10-2007-0073635 | 7/2007 |
| WO | 2007/040201 | 4/2007 |
| WO | 2007/044990 | 4/2007 |
| WO | 2007/078172 | 7/2007 |
| WO | 2008/000489 | 1/2008 |

OTHER PUBLICATIONS

European Patent Office Application Serial No. 09820770, Search Report dated Jul. 10, 2014, 6 pages.

* cited by examiner (a)

(b)

(a)

(b)

METHOD OF ALLOCATING PAGING CARRIER AND MOBILE STATION

CROSS-REFERENCE TO RELATED APPLICATIONS

This application is the National Stage filing under 35 U.S.C. 371 of International Application No. PCT/KR2009/005937, filed on Oct. 15, 2009, which claims the benefit of earlier filing date and right of priority to Korean Application No. 10-2008-0138079, filed on, Dec. 31, 2008, and also claims the benefit of U.S. Provisional Application Serial Nos. 61/246,539, filed on Sep. 29, 2009, 61/109,509, filed on Oct. 30, 2008, 61/106,978, filed on Oct. 21, 2008, and 61/105,793, filed on Oct. 15, 2008, the contents of which are all hereby incorporated by reference herein in their entireties.

TECHNICAL FIELD

The present invention relates to a radio access system, and more particularly, to a method of allocating a paging carrier in a multi-carrier environment.

BACKGROUND ART

Hereinafter, a single-carrier and multi-carrier modulation scheme used in the embodiments of the present invention will be briefly described.

A Single-Carrier Modulation (SCM) scheme refers to a modulation scheme for performing modulation by carrying all information on one carrier, unlike a Multi-Carrier Modulation (MCM) scheme.

The SCM scheme is weak against frequency selective fading. Accordingly, in order to overcome the frequency selective fading, a complicated equalizer is necessary. In addition, if the SCM scheme is used, a protective band or the like is necessary and thus band efficiency is bad.

The MCM scheme refers to a technology of dividing an overall bandwidth channel into several sub-channels each having a small bandwidth and transmitting a plurality of narrowband sub-carriers through the sub-channels.

In the MCM scheme, each of the sub-channels is approximated so as to have a flat channel due to the small bandwidth. The MCM scheme can compensate for distortion of a channel using a simple equalizer. In addition, the MCM scheme is implemented at a high speed using Fast Fourier Transform (FFT) and is more advantageous in high-speed data transmission than the SCM scheme.

Hereinafter, an idle mode of a mobile station and a paging group related to the embodiments of the present invention will be briefly described.

The idle mode generally refers to an operation for enabling downlink (DL) broadcast traffic reception to be periodically performed although a mobile station is not registered in a specific base station, when the mobile station is moved in a radio link environment including multiple base stations.

If a mobile station does not receive traffic from a base station during a predetermined time, the mobile station may transition to the idle mode in order to save power. The mobile station which transitions to the idle mode may receive a broadcast message (e.g., a paging message) transmitted by the base station during an available interval and determine whether the mobile station transitions to a normal mode or is in the idle mode. In addition, the mobile station which is in the idle mode performs location update so as to inform a paging controller of its location.

The idle mode may eliminate demands for activation associated with handover and demands for a general operation so as to provide benefits to a mobile station. The idle mode may restrict the activity of a mobile station to be scanned in a discrete period so as to reduce power consumption and operational resources used by the mobile station.

In addition, the idle mode may provide a simple appropriate scheme for informing a mobile station of pending DL traffic, and eliminate radio interface and network handover (HO) traffic from an inactive mobile station so as to provide benefits to a network and a base station.

Paging refers to a function for recognizing the location (e.g., any base station or any mobile switching center) of a Mobile Station (MS) when an incoming signal is occurred in mobile communication. A plurality of Base Stations (BSs) for supporting the idle mode may be included in a specific paging group so as to configure a paging area.

At this time, the paging group indicates a logical group. The paging group is used to provide a neighbor area which may be paged in DL if there is traffic which targets an MS. It is preferable that the size of the paging group be large enough to enable a specific mobile station to be located in the same paging group during the most time, and small enough to enable a paging load to be held at an appropriate level.

The paging group may include at least one BS. One BS may be included in one or more paging groups. The paging group is defined in a management system. In the paging group, a paging-group-action backbone network message may be used. In addition, a paging controller may manage a list of mobile stations, which are in the idle mode, using a paging-announce message which is one of backbone messages, and manage initial paging of all BSs belonging to the paging group.

The coverage of a mobile station which enters the idle mode becomes a BS paging group which is a group of multiple BSs. That is, a mobile station which is in the idle mode may belong to at least one of geometrically separated BS paging groups. In addition, a base station may recognize the location of an idle-mode mobile station in a unit of a paging group only, although the idle-mode mobile station does not receive a service from the base station. Accordingly, the base station should broadcast a paging message to mobile stations in all paging intervals which are set with respect to the idle-mode mobile stations belonging to its paging group. At this time, when the base station belongs to one paging group and supports multiple carriers, all the carriers supported by the base station have the same paging group ID.

DISCLOSURE

Technical Problem

An object of the present invention devised to solve the problem lies in a method of efficiently allocating a paging carrier in a broadband radio access network.

Another object of the present invention devised to solve the problem lies in a method of efficiently allocating paging carriers to mobile stations if multiple carriers are supported in a radio access system.

A further object of the present invention devised to solve the problem lies in a method of, at a network (or a base station), explicitly informing a mobile station of a paging carrier and a method of enabling a mobile station to implicitly recognize a paging carrier.

It is to be understood that technical problems to be solved by the present invention are not limited to the aforementioned technical problems and other technical problems which are not mentioned will be apparent from the following description to the person with an ordinary skill in the art to which the present invention pertains.

Technical Solution

The object of the present invention can be achieved by providing a method of allocating a paging carrier in a radio access system, the method including: allocating a paging channel to a predetermined carrier of multiple carriers including one or more carriers so as to generate the paging carrier; and transmitting a first message including allocation information of the paging carrier. The first message may be a broadcast channel (BCH) or additional broadcast information, and the first message may be broadcast to one or more mobile stations.

The allocation information may be a flag indicating whether the paging channel is allocated to a specific carrier. Alternatively, the allocation information may be an identifier of the paging carrier or an index of the paging carrier.

The method may further include receiving a basic capability request message or a registration request message. In this case, the first message may be a basic capability response message or a registration response message. At this time, the allocation information may include a number parameter indicating the total number of one or more carriers included in the multiple carriers, identifiers of the one or more carriers and a paging carrier support parameter indicating whether each of the one or more carriers includes the paging channel.

The method may further include receiving a deregistration request message for requesting entry of a mobile station into an idle mode; and transmitting a deregistration command message including changed paging carrier allocation information to the mobile station. At this time, the deregistration request message may include information about the paging carrier requested by the mobile station.

In another aspect of the present invention, provided herein is a method of allocating a paging carrier in a radio access system, the method including: receiving a first message including first allocation information of the paging carrier; transmitting a second message for requesting entry into an idle mode to a base station; and receiving a third message including second allocation information of a changed paging carrier from the base station. At this time, the paging carrier may include a paging channel out of multiple carriers including one or more carriers.

The first allocation information may be an identifier of the paging carrier or an index of the paging carrier. Alternatively, the first allocation information may include a number parameter indicating the total number of one or more carriers included in the multiple carriers, identifiers of the one or more carriers and a paging carrier support parameter indicating whether each of the one or more carriers include the paging channel.

The first message may be a basic capability response message or a registration response message, the second message may be a deregistration request message, and the third message may be a deregistration response message.

In another aspect of the present invention, provided herein is a method of allocating a paging carrier in a radio access system, the method including: receiving a first message including a paging identifier from a base station; and acquiring the paging carrier using a Medium Access Control (MAC) address of a mobile station and the paging identifier. At this time, the paging carrier may include a paging channel out of multiple carriers including one or more carriers.

The acquiring of the paging carrier may be performed using a value calculated by performing a modulo operation of the paging identifier with predetermined least significant bits of the MAC address.

In another aspect of the present invention, provided herein is a mobile station including: a reception unit receiving a radio signal from an external device; a transmission unit transmitting a radio signal to the external device; and a processor, wherein the reception unit receives a first message including first allocation information of a paging carrier from a base station and receives a second message including second allocation information of a changed paging carrier, and the processor generates a third message for requesting entry of the mobile station into an idle mode and transmits the third message to the base station through the transmission unit.

The paging carrier may include a paging channel out of multiple carriers including one or mode carriers, and the first allocation information may be an identifier of the paging carrier or an index of the paging carrier.

The first message may be a basic capability response message or a registration response message, the second message may be a deregistration response message, and the third message may be a deregistration request message.

In another aspect of the present invention, provided herein is a mobile station including: a reception unit receiving a radio signal from an external device; a transmission unit transmitting a radio signal to the external device; and a processor, wherein the reception unit receives a first message including a paging identifier from a base station, the processor acquires the paging carrier using a Medium Access Control (MAC) address of the mobile station and the paging identifier, and the paging carrier includes a paging channel out of multiple carriers including one or more carriers.

The processor may perform a modulo operation of the paging identifier with predetermined least significant bits of the MAC address and acquire the paging carrier based on a value calculated by the operation. It is understood by those skilled in the art that the above embodiments are only some of the preferred embodiments of the present invention, and various embodiments having the technical features of the present invention are derived from the detailed description of the present invention.

Advantageous Effects

The embodiments of the present invention have the following effects.

First, it is possible to efficiently allocate a paging carrier using the embodiments of the present invention.

Second, a base station can efficiently allocate a paging carrier to a mobile station if multi-carrier is supported in a network.

Third, it is possible to efficiently use radio resources (e.g., carriers) in a multi-carrier environment using the embodiments of the present invention.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
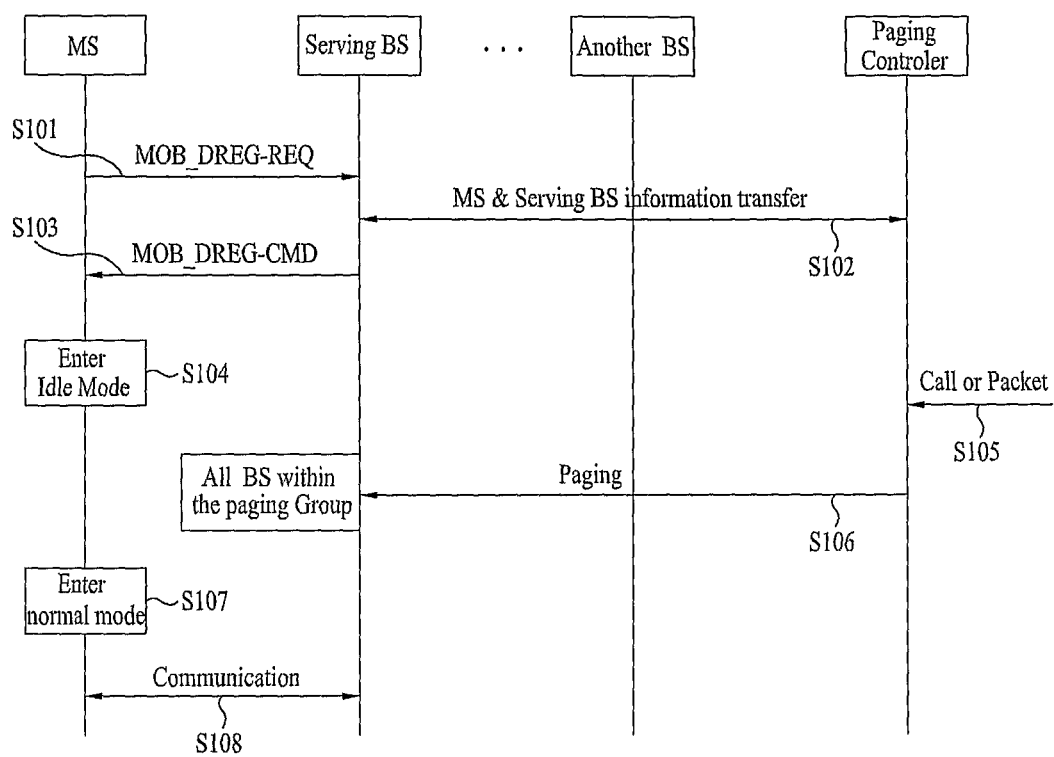
FIG. 1 is a view showing a paging procedure in an IEEE 802.16 system which is one type of radio access system.

The present invention relates to a radio access system. The present invention discloses various methods of allocating a paging carrier in a multi-carrier environment.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station" may be replaced with the terms fixed station, Node-B, eNode-B (eNB), or access point as necessary. The term "mobile station (MS)" may also be replaced with the term user equipment (UE), subscriber station (SS), mobile subscriber station (MSS) or mobile terminal as necessary.

A transmitter refers to a node for transmitting a data or voice service, and a receiver refers to a node for receiving a data or voice service. Accordingly, in uplink transmission, a mobile station becomes a transmitter and a base station becomes a receiver. Similarly, in downlink transmission, a mobile station becomes a receiver and a base station becomes a transmitter.

Meanwhile, as the MS of the present invention, a Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit is located inside or outside of the processor, so that it can communicate with the aforementioned processor via a variety of well-known parts.

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE 802.16 system.

It should be noted that specific terms disclosed in the present invention are proposed for convenience of description and better understanding of the present invention, and the use of these specific terms may be changed to another format within the technical scope or spirit of the present invention.

In the embodiments of the present invention, it is assumed that a Multi-Carrier Modulation (MCM) scheme is used. Accordingly, a Mobile Station (MS) and a Base Station (BS) can efficiently perform communication using a plurality of carriers. The embodiments of the present invention are applicable to radio access technologies other than the IEEE 802.16e/m network (and/or 3GPP LTE) which is one type of radio access system.

First, two types of carriers applicable to a multi-carrier environment will be described.

In the multi-carrier environment, the following two types of carriers are defined.

First, a primary carrier is the carrier used by the BS and the MS to exchange traffic and full PHY/MAC control information defined in the 16m specification. Further, the primary carrier is used for control functions for proper MS operation, such as network entry. Each MS shall have only one carrier it considers to be its primary carrier in a cell.

A secondary carrier is an additional carrier which the MS may use for traffic, only per BS's specific allocation commands and rules, typically received on the primary carrier. The secondary carrier may also include control signaling to support multi-carrier operation.

The carriers of a multi-carrier system based on the above-described primary and secondary carriers may be differently configured as follows.

First, a fully configured carrier is a carrier for which all control channels including synchronization, broadcast, multicast and unicast control signaling are configured. Further, information and parameters regarding multi-carrier operation and the other carriers can also be included in the control channels.

A partially configured carrier is a carrier with only essential control channel configuration to support traffic exchanges during multi-carrier operation.

It is preferable that the primary carrier is selected from the fully configured carriers. In contrast, the secondary carrier may be fully or partially configured according to a user's requirement and channel state. In addition, when one of fully configured carriers within the cell is configured as a primary carrier for any MS, the primary carrier may control the MS. In addition, the MS may dynamically use multiple secondary carriers, for data transmission.

In general, the MS can acquire all control information and information about secondary carriers using the primary carrier. In addition, the MS and the BS can transmit or receive data using the secondary carriers. In the embodiments of the present invention, a Fully Configured Secondary Carrier (FCSC) configured in a specific MS may be set to a primary carrier of another MS.

FIG. 1 is a view showing a paging procedure in an IEEE 802.16 system which is one type of radio access system.

In an idle mode, paging may be performed in paging group units. For example, an MS may belong to one or a plurality of paging groups. A paging controller (PC) of each paging group performs paging for searching for an MS, when a call or a user packet transmitted from an external network to the MS is input. At this time, the PC transmits a paging message to all BSs in the paging group, and the BSs which receive the paging message can perform paging in a manner of broadcasting a paging advertisement (MOB_PAG-ADV) message to MSs.

Referring to FIG. 1, the MS transmits a deregistration request (MOB_DREG-REQ) message to a serving BS (SBS) in order to switch a normal mode to the idle mode (S101).

The SBS which receives the deregistration request message may transmit or receive mobile station information and SBS information to or from the PC. That is, the SBS may inform the PC of an ID of an MS which enters the idle mode and an SBS ID. In addition, the PC may inform the SBS of a paging group ID (PG ID) or a PC ID. The paging group ID or the PC ID may be used to transmit or receive a paging message (S102).

The SBS may transmit a deregistration command (MOB_DREG-CMD) message to the MS in response to the deregistration request message. The deregistration command message may include paging information. At this time, the paging information may include a paging cycle parameter, a paging offset parameter and a paging listen interval parameter. In addition, the deregistration command message may further include a PC ID and a Paging Group (PG) ID (S103).

The MS which receives the MOB_DREG-CMD message may enter the idle mode. The MS may receive the paging message using the paging information included in the MOB_DREG-CMD message. That is, the MS may monitor a radio channel so as to determine whether a paging message is transmitted thereto during the paging listen interval. During the remaining interval of the paging cycle, the MS operates in a sleep mode or a radio off mode so as to reduce battery consumption (S104).

A call or an external packet may be input to the PC (S105).

When the PC receives the call or the external packet, the paging procedure may be performed. At this time, the PC transmits a paging message to all BSs within the paging group (S106).

The BSs in the paging group, which receive the paging message, broadcast an MOB_PAG-ADV message to respective MSs managed by the BSs (S107).

The MS confirms the MOB_PAG-ADV message, and enters the normal mode and performs communication with the SBS when the PC performs paging with respect to the MS (S108 and S109).

The messages and the procedures described with reference to FIG. 1 are applicable to the following embodiments of the present invention.

1. Method of Allocating Paging Channel in Multi-Carrier Environment

Figure 2:
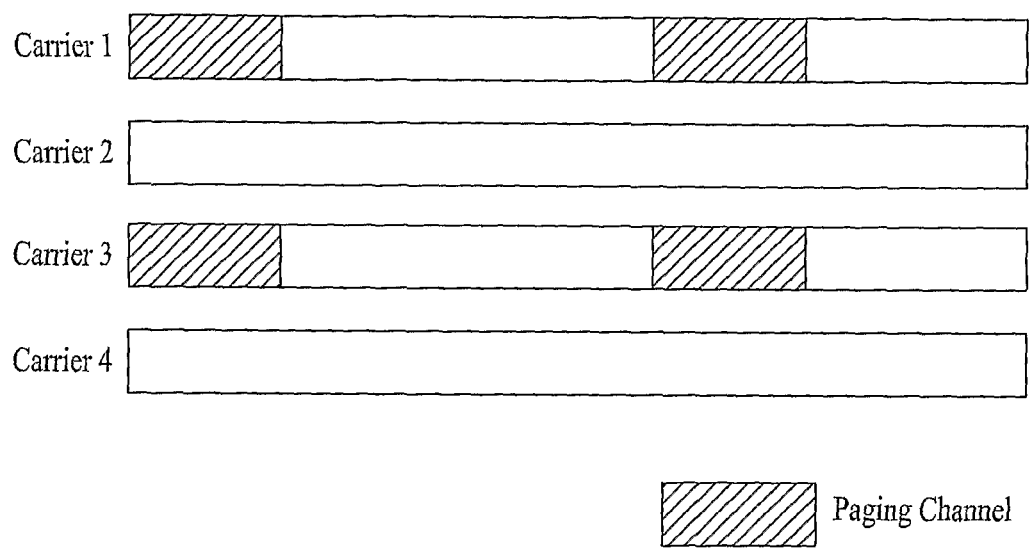
FIG. 2 is a view showing a method of allocating a paging channel based on a multi-carrier environment according to an embodiment of the present invention.

FIG. 2 is a view showing a method of allocating a paging channel based on a multi-carrier environment according to an embodiment of the present invention.

In one embodiment of the present invention, it is assumed that a BS has a predetermined number (e.g., N) of multiple radio frequency carriers and the carriers may admit a predetermined number (e.g., L) of MSs for paging. At this time, the BS or a network operator may determine the number of carriers including paging channels according to the number of MSs which are paged.

If the paging channels are allocated to M (<=N) carriers of the N carriers, the BS may provide a paging service to a maximum of M*L MSs. FIG. 2 shows the case where the BS uses four carriers. At this time, the paging channels are allocated to Carrier 1 and Carrier 3. In the embodiments of the present invention, carriers, to which the paging channels are allocated, of the multiple carriers may be called paging carriers. The paging channels can be allocated to all kinds of carriers (e.g., fully configured carrier or partially configured carrier). In the description of the present invention, it is assumed that the paging channels are allocated to fully configured carriers in the multiple carriers. That is, the paging carriers are preferably the fully configured carriers.

Figure 3:
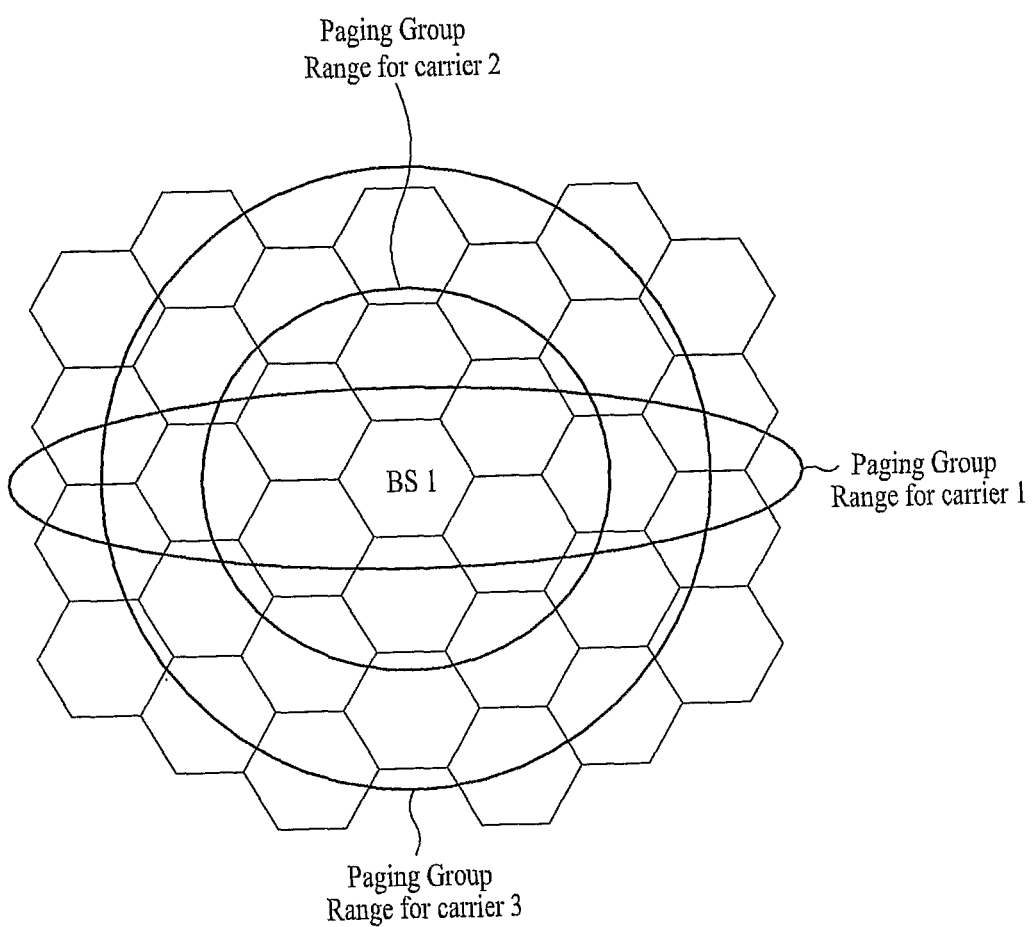
FIG. 3 is a view showing the configuration of a paging group in a multi-carrier environment according to an embodiment of the present invention.

FIG. 3 is a view showing the configuration of a paging group in a multi-carrier environment according to an embodiment of the present invention.

In FIG. 3, one BS may be included in at least one paging group. The coverage of the paging group may be changed according to a channel environment or a user's requirement. Referring to FIG. 3, a first paging group range may be allocated to an MS having high mobility. A second paging group range may be allocated to an MS having low mobility or a stopping MS. A third paging group range may be allocated to an MS having high mobility and a large active radius.

The second paging group and the third paging group may be managed by a Small Paging Group (SPG) and a Large Paging Group (LPG), respectively. That is, one or more second paging groups may be included in the third paging group. If the mobility of the MS included in the second paging group is increased, the MS performs location update to the third paging group.

In FIG. 3, the BS may allocate Carrier 1 of FIG. 2 to the first paging group having a wide range, and allocate Carrier 2 or Carrier 4 of FIG. 2 to the second paging group having a narrow range. In addition, the BS may allocate Carrier 3 of FIG. 2 to the third paging group having a wide range.

Referring to FIG. 3, when the MS transitions to the idle mode, the BS may allocate an adequate paging carrier to the MS. For example, the BS may allocate Carrier 2 to a low-speed MS and allocate Carrier 1 or Carrier 3 to a high-speed MS. At this time, Carrier 1 and Carrier 3 indicate paging carriers.

In addition, the BS and the MS may change the paging carrier of the MS according to the mobility of the MS, after the MS enters the idle mode. For example, although Carrier 2 is initially allocated to the MS which enters the idle mode due to low mobility, the MS may move at a high speed so as to frequently perform location update. In this case, the BS may reallocate the paging carrier (e.g., Carrier 1 or 3) for covering the wide paging range to the MS. As the mobility of the MS is increased, the MS may directly request the change of the paging group or the paging carriers to the BS.

2. Method of Allocating Paging Carrier

Figure 4:
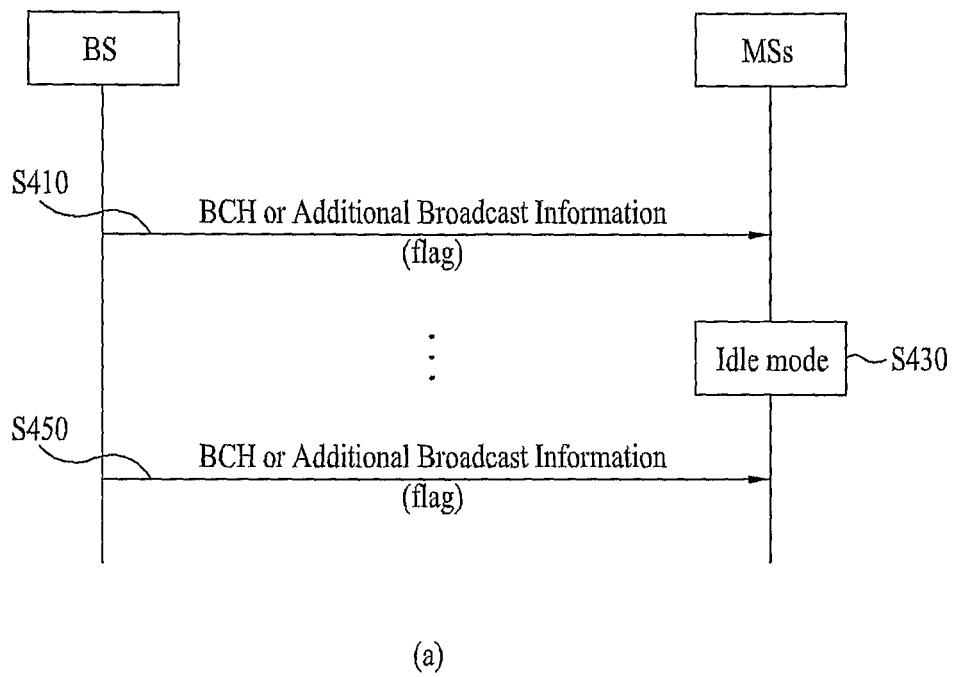
FIG. 4 is a view showing an example of a method of allocating a paging carrier according to another embodiment of the present invention.
Figure 4:
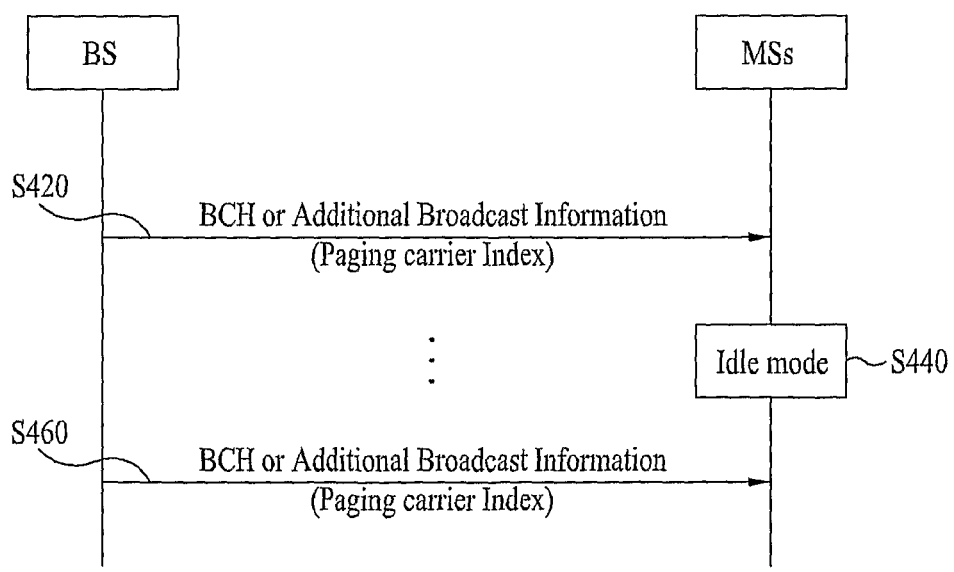

FIG. 4 is a view showing a method of allocating a paging carrier according to another embodiment of the present invention.

A BS may allocate a paging carrier to an MS according to a channel environment or a user's requirement. At this time, the BS may indicate which of multiple carriers includes a paging channel to the MS.

FIG. 4(*a*) shows a method of indicating a paging channel using a flag. The BS may indicate whether there is a paging channel for each of multiple carriers to the MS through a Broadcast Channel (BCH) or an additional broadcast channel (S410).

For example, if the value of the flag included in the BCH or the additional broadcast information is "0", it is indicated that the carrier does not have a paging channel and, if the value of the flag is "1", it is indicated that the carrier has a paging channel.

In FIG. 4(*a*), the MS may enter the idle mode (S430).

In this case, the BS may allocate the paging channels to the MS using the BCH or the additional broadcast information or inform the MS of changed carriers of carriers to which the paging channels are allocated. That is, the BS may transmit the BCH including a flag indicating that the paging carriers are changed (S450).

FIG. 4(*b*) shows a method of, at a BS, allocating multiple carriers including paging channels using a paging carrier index.

Referring to FIG. 4(*b*), the BS may transmit a BCH or additional broadcast information including the paging carrier indices to an MS (S420).

The paging carrier indices indicate indices of paging carriers including paging channels in the multiple carriers. Table 1 shows an example of a paging carrier index format.

TABLE 1

| Syntax | Size | Note |
|---|---|---|
| Paging Carrier Index{ | | |
| Carrier 1 | | |
| Carrier 3 | | |
| ~ | | |
| Carrier n | | |

Table 1 shows the carrier indices (e.g., Carrier 1, Carrier 3, . . . , and Carrier n) including the paging channels in n multiple carriers used by the BS. That is, the BS may inform the MS which carriers include the paging channels using the paging carrier indices.

Referring to FIG. 4(*b*) again, the MS may enter the idle mode (S440).

In this case, the BS may allocate the paging channels to the MS or indicate changed carriers of carriers to which the paging channels are allocated. That is, the BS may transmit the BCH or the additional broadcast information including the paging carrier indices indicating the paging carriers allocated when the MS enters the idle mode or the paging carriers changed when the MS enters the idle mode (S460).

Figure 5:
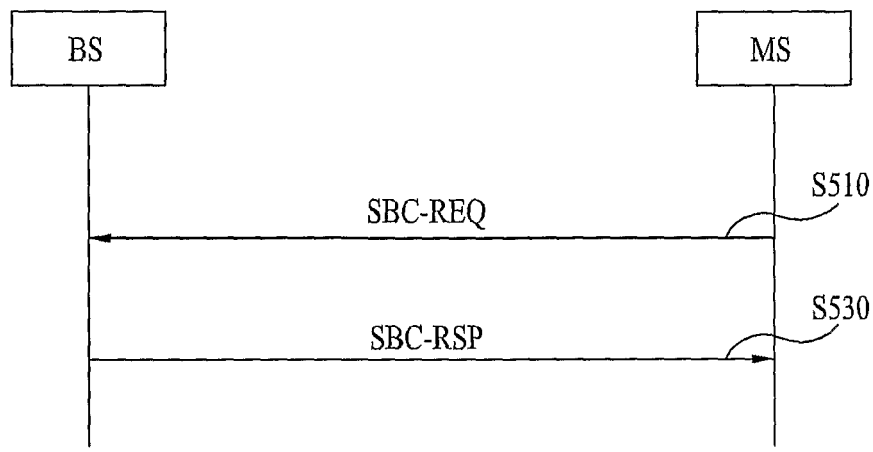
FIG. 5 is a view showing another example of a method of allocating a paging carrier according to another embodiment of the present invention.
Figure 5:
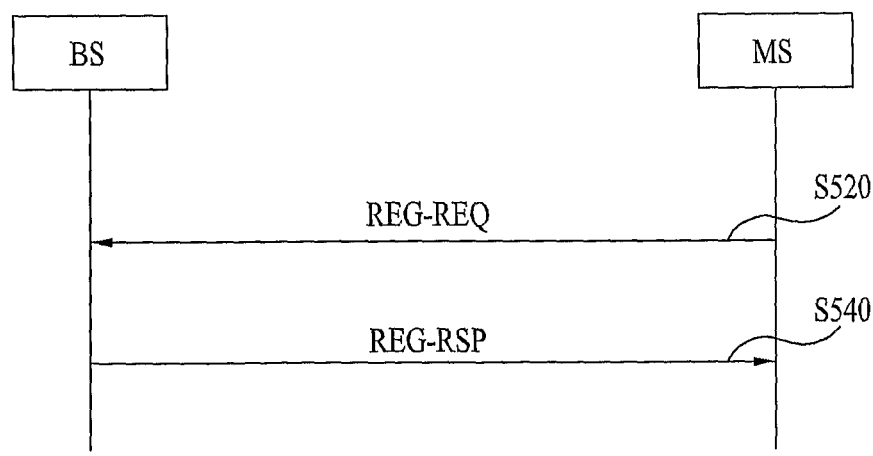

FIG. 5 is a view showing a method of allocating a paging carrier according to another embodiment of the present invention.

FIG. 5 shows a method of, at a BS, indicating whether a paging channel is included in multiple carriers allocated to a specific MS in a unicast mode.

Referring to FIG. 5(*a*), the MS transmits a Subscriber Station Basic Capability Request (SBC-REQ) message to the BS during initial access so as to negotiate with the BS for basic capability (S510).

The BS may allocate paging carriers to the MS according to a channel environment or a user's requirement. At this time, the BS may indicate which of the multiple carriers includes the paging channel to the MS through a paging carrier support parameter.

For example, if the BS belongs to one paging group, all carrier(s) of the BS have the same paging group ID. At this time, the BS may indicate the carrier(s) transmitted by a paging message out of the carrier(s) supported by the BS to the MS through the paging carrier support parameter. In addition, if the BS belongs to one or more paging groups, the carrier(s) supported by the BS may have different paging group IDs. At this time, the BS may indicate the carrier(s) transmitted by a paging message out of the carrier(s) supported by the BS to the MS through the paging carrier support parameter, for each of the paging groups. That is, the BS may transmit a Subscriber Station Basic Capability Response (SBC-RSP) message including the paging carrier support parameter to the MS (8530).

In addition, the paging carrier support parameter suggested by the present invention may be transmitted to the MS not only through the SBC-RSP message but also through an additional broadcast message. Examples of such a message include a Neighbor Advertisement (NBR-ADV) message, a Multi-Carrier (MC)-ADV message and PGID_information.

Among these, an example of the PGID_information format will be described with reference to Table 2.

TABLE 2

| Name | Value |
|---|---|
| Type | |
| If (Type == Single Carrier) { | |
| Num_PGIDs | Number of paging groups in the ABS |
| for (i=0; i< Num_PGIDs; i++) { | |
| PGID | Identifier of paging group (0~$2^{16}$) |
| } | |
| } | |
| If (Type == Multi Carrier) { | |
| Num_PGIDs | Number of paging groups in the ABS |
| for (i=0; i< Num_PGIDs; i++) { | |
| PGID | Identifier of paging group (0~$2^{16}$) |
| N | Number of paging carriers per PGID |
| Num_physical carriers | |
| for (j=0; j< Num_physical carriers; <j+) { | |
| Physical Carrier index | |
| Paging Carrier Support | 0: Does not have Paging Channel |
| | 1: Has Paging Channel |
| } | |
| } | |
| } | |
| M | Time domain hash parameter (1~4) used to determine the frame number of a superframe for paging message transmission of an idle mode AMS. |

Referring to Table 2, the PGID_information may include a field indicating the number of physical carriers and a field indicating a physical carrier index, and indicate whether the carrier has a paging channel through a paging carrier support field.

The PGID_information may be included in the NBR-ADV message as shown in Table 3 and transmitted to the MS in the format of neighbor BS information.

Table 3 shows another embodiment of the present invention in which the PGID_information is included in the NBR-ADV message.

TABLE 3

| Syntax | Size (bit) | Notes |
|---|---|---|
| AAI_NBR-ADV_Message_format( ) { | — | — |
| ~ | | |
| Num Neighbor BSIDs | | |
| for (i=0; i< Num Neighbor BSIDs; i++) { | | |
| PGID Information | | |
| } | | |
| ~ | | |
| } //End of AAI_NBR-ADV | | |

As another aspect of another embodiment of the present invention, in a case where only the information on a single carrier is included in the PGID_information as shown in Table 3-1, other parameters as shown in Table 3-2 are included in the AAI_NBR-ADV message instead of the PGID_information (i.e., Single Carrier Information).

Table 3-1 shows another aspect of another embodiment of the present invention in which only the single carrier information is included in the PGID_information.

TABLE 3-1

| Name | Value |
|---|---|
| Num_PGIDs | Number of paging groups in the ABS |
| for (i=0; i< Num_PGIDs; i++) { | |
| PGID | Identifier of paging group (0~$2^{16}$) |
| } | |
| M | Time domain hash parameter (1~4) used to determine the frame number of a superframe for paging message transmission of an idle mode AMS. |

Table 3-2 shows another aspect of another embodiment of the present invention in which other are included in the AAI_NBR-ADV message instead of the single carrier information.

TABLE 3-2

| Syntax | Size (bit) | Notes |
|---|---|---|
| AAI_NBR-ADV_Message_format( ) { | — | — |
| ~ | | |
| Num Neighbor BSIDs | | |
| for (i=0; i< Num Neighbor BSIDs; i++) { | | |
| Num_PGIDs | | Number of paging groups in the ABS |
| for (j=0; j< Num_PGIDs; j++) { | | for (i=0; i< Num_PGIDs; i++) { |
| PGID | | Identifier of paging group (0~216) |
| N | | Number of paging carriers per PGID |

TABLE 3-2-continued

| Syntax | Size (bit) | Notes |
|---|---|---|
| Num_physical carriers for (k=0; k< Num_physical carriers; <k+) { Physical Carrier index Paging Carrier Support | | Num_physical carriers for (j=0; j< Num_physical carriers; <j+) { Physical Carrier index Paging Carrier Support |
| | 0: Does not have Paging Channel 1: Have Paging Channel | |
| } // end of for (k=0; k< Num_physical carriers; <k+) } //end of for (j=0; j< Num_PGIDs; j++ ) } // end of for (i=0; i< Num Neighbor BSIDs; i++) ~ } //End of AAI_NBR-ADV | | } } |

As still another aspect of another embodiment of the present invention, an AAI_NBR-ADV message format including information about paging carriers can be expressed as Table 3-3.

Table 3-3 shows an AAI_NBR-ADV message format including information about paging carriers in accordance with still another aspect of another embodiment of the present invention.

TABLE 3-3

| Syntax | Size (bit) | Notes |
|---|---|---|
| AAI_NBR-ADV_Message_format( ) { ~ Num Neighbor BSIDs for (i=0; i< Num Neighbor BSIDs; i++) { Num Carriers | — | — |
| | | Number of carriers supported by the BS |
| for (j=0; j< Num Carriers; j++) { Physcial Carrier Index Num_PGIDs for (k=0 ; k< Num_PGIDs; k++){ PGID Paging Carrier Support | | 0: Does not have Paging Channel 1: Have Paging Channel |
| N | | Number of paging carriers per PGID |
| }// end of for (k=0 ; k< Num_PGID ; k++) }// end of for (j=0; j< Num Carriers; j++) }// end of (i=0; i< Num Neighbor BSIDs; i++) ~ } //End of AAI_NBR-ADV | | |

Table 3-4 shows an AAI_NBR-ADV message format including information about paging carriers in accordance with a further aspect of another embodiment of the present invention.

TABLE 3-4

| Syntax | Size (bit) | Notes |
|---|---|---|
| Num Neighbor BSIDs for (i=0; i< Num Neighbor BSIDs; i++) { Num_physical carriers | | Number of physical carriers |
| for (j=0; j< Num_physical carriers; j++) { Physcial Carrier Index Paging Carrier Indicator | | 0: this carrier does not transmit paging message for idle mode MS. 1: this carrier transmits paging message for idle mode MSs. |
| Num_PGIDs for (k=0 ; k< Num_PGIDs; k++) { PGID } } } | | |

Next, the MC-ADV message format including the paging carrier support parameter will be described with reference to Table 4 and Table 4-1.

TABLE 4

| Syntax | Size (bit) | Notes |
|---|---|---|
| AAI_MC-ADV_Message_format( ) { ~ Num Carriers | — | — |
| | | Number of carriers supported by the BS |
| for (i=0; i< Num Carriers; i++) { Physical Carrier Index PGID Paging Carrier Support | | 0: Does not have Paging Channel 1: Has Paging Channel |

TABLE 4-continued

| Syntax | Size (bit) | Notes |
|---|---|---|
| } | | |
| Num_PGID | | |
| For (j=0 ; j< Num_PGID ; j++){ | | |
| N | | Number of paging carriers per PGID |
| } | | |
| ~ | | |
| } //End of AAI_MC-ADV | | |

As another aspect of Table 4, an AAI_MC-ADV message format can be expressed as Table 4-1.

TABLE 4-1

| Syntax | Size (bit) | Notes |
|---|---|---|
| AAI_MC-ADV_Message_format( ) { | — | — |
| ~ | | |
| Num physical carriers | | Num_physical carriers |
| for (i=0; i< Num_physical carriers; i++) { | | |
| Physcial Carrier Index | | |
| Paging Carrier Support | | 0: Does not have Paging Channel |
| | | 1: Have Paging Channel |
| if (Paging Carrier Support == 1) { | | |
| Num_PGIDs | | |
| for (j=0 ; j< Num_PGIDs; j++) | | |
| { | | |
| PGID | | |
| N | | Number of paging carriers |
| }// end of for (j=0 ; j< Num_PGID ; j++) | | |
| } // end of if (paging carrier support == 1) | | |
| }// end of for (i=0; i< Num physical carriers; i++) | | |
| ~ | | |
| } //End of AAI_MC-ADV | | |

Referring to Table 4 and Table 4-1, the PGID per carrier and the paging carrier support field are included in the MC-ADV message so as to indicate whether the carrier has a paging channel to the MS.

The MS may recognize the number N of carriers for supporting the paging carriers out of carriers supported within the same paging group based on carrier information (paging carrier support, PGID, carrier index) received through the PGID_information, the NPR-ADV message or the MC-ADV message. The MS may implicitly check which carrier is monitored in order to receive the paging message within the paging group, to which the MS belongs, using the following formula.

Paging ID(Temporary ID) % N(number of paging carriers which are supported by an arbitrary Paging Group, that is, number of carriers through which a paging message for an arbitrary paging group are transmitted)==AMS Paging Carrier's index Table 5 shows an example of the SBC-RSP message format used in step S530.

TABLE 5

| Syntax | Size (bit) | Notes |
|---|---|---|
| MOB_SBC-RSP_Message_format( ) { | — | — |
| ~ | | |
| N_Carriers | | Total number of Carriers |
| For(i=0; i<N_Carriers;i++) | | |
| { | | |
| Carrier ID | | Carrier ID |
| Paging Carrier Support | | 0: Does not have Paging Channel |
| | | 1: Has Paging Channel |
| } | | |
| ~ | | |
| } //End Of MOB_SBC-RSP | | |

Referring to Table 5, the SBC-RSP message may include a carrier number (N_Carriers) parameter indicating the total number of multiple carriers, a carrier ID of each of the multiple carriers, and a paging carrier support parameter indicating whether each carrier includes a paging channel.

In Table 5, the paging carrier support parameter may have a size of 1 bit. At this time, the paging channel is not allocated to the carrier if the paging carrier support parameter is "0" and the paging carrier is included in the carrier if the paging carrier support parameter is "1".

FIG. 5(*b*) shows the case where a BS allocates paging channel indices to an MS in a process of registering the MS in the BS. Referring to FIG. 5(*b*), the MS may transmit a registration request (REG-REQ) message to the BS in order to perform a registration procedure (S520).

The BS may allocate multiple carriers to the MS. At this time, the BS should inform the MS of information about the carriers allocated to the MS and carriers including paging channels. Accordingly, the BS may transmit a registration response (REG-RSP) message including paging channel indices (S540).

Table 6 shows an example of the REG-RSP message format used in step S540.

TABLE 6

| Syntax | Size (bit) | Notes |
|---|---|---|
| MOB_REG-RSP_Message_format( ) { | — | — |
| ~ | | |
| N_Carriers | | Total number of Carriers |
| For(i=0; i<N_Carriers;i++) | | |
| { | | |
| Carrier ID | | Carrier ID |
| Paging Carrier Support | | 0: Does not have Paging Channel |
| | | 1: Has Paging Channel |
| } | | |
| ~ | | |
| } //End of MOB_REG-RSP | | |

In Table 6, the parameters included in the REG-RSP message may refer to Table 5.

As another aspect of the embodiment described with respect to FIG. 5, the BS may indicate whether the paging channels are allocated to the MS using the paging channel indices described with respect to Table 1, instead of the SBC-RSP message or the REG-REQ message used in steps S530 and S540. That is, the BS may transmit the SBC-RSP message or the REG-RSP message including the paging carrier indices indicating the carriers, to which the paging channels are allocated, to the MS.

3. Method of Changing Paging Carrier

Figure 6:
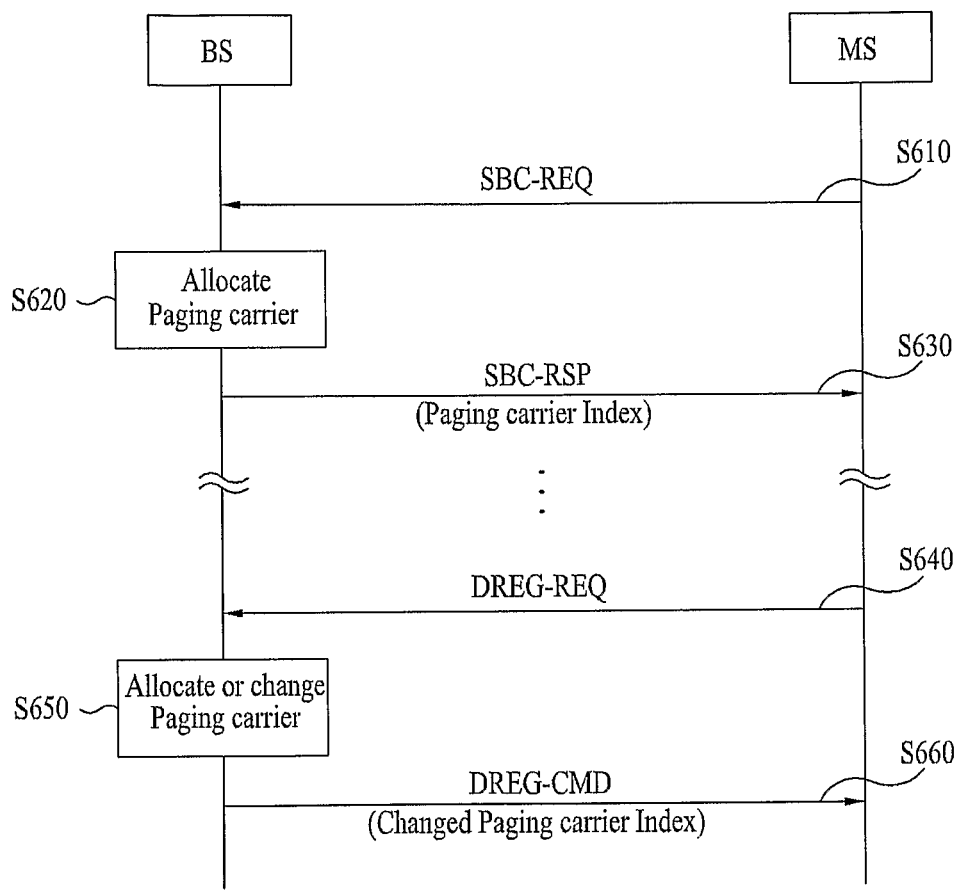
FIG. 6 is a view showing a method of, at a base station, changing a paging carrier allocated to a mobile station according to another embodiment of the present invention.

FIG. 6 is a view showing a method of, at a BS, changing a paging carrier allocated to an MS according to another embodiment of the present invention.

The BS may change the paging carrier when the MS enters the idle mode. FIG. 6 shows a method of, at the BS, allocating the paging carrier to the MS.

The MS may transmit a SBC-REQ message to the BS for basic capability negotiation (S610).

The BS may allocate the paging carrier to the MS according to a channel environment or a user's requirement (S620).

The BS may transmit an SBC-RSP message to the MS in order to indicate the paging carrier. At this time, the SBC-RSP message used in step S530 may be used as the SBC-RSP message (S630).

After the MS moves a cell area of the BS, the MS may enter the idle mode. Accordingly, the MS may transmit a DREG-REQ message to the BS in order to enter the idle mode (S640).

When the MS transitions to the idle mode, the BS may allocate the paging carrier to the MS, retain the paging carrier which is previously allocated or change the allocated paging carrier (S650).

In the embodiment of the present invention, it is assumed that the BS changes the paging carrier allocated in step S620. Accordingly, the BS may transmit a DREG-CMD message to the MS in order to inform the MS of the changed paging carrier (S660).

TABLE 7

| Syntax | Size (bit) | Notes |
|---|---|---|
| MOB_DREG-CMD_Message_format( ) { | — | — |
| ~ | | |
| Paging Carrier ID or Paging Carrier Index(Optional) | | Paging Carrier ID or Index allocated to the MS |
| Paging Group ID | | Paging Group ID allocated to the MS |
| ~ | | |
| } //End of MOB_DREG-CMD | | |

Referring to Table 7, the DREG-CMD message may include a paging carrier ID or a paging carrier index indicating the paging carrier allocated to the MS.

Figure 7:
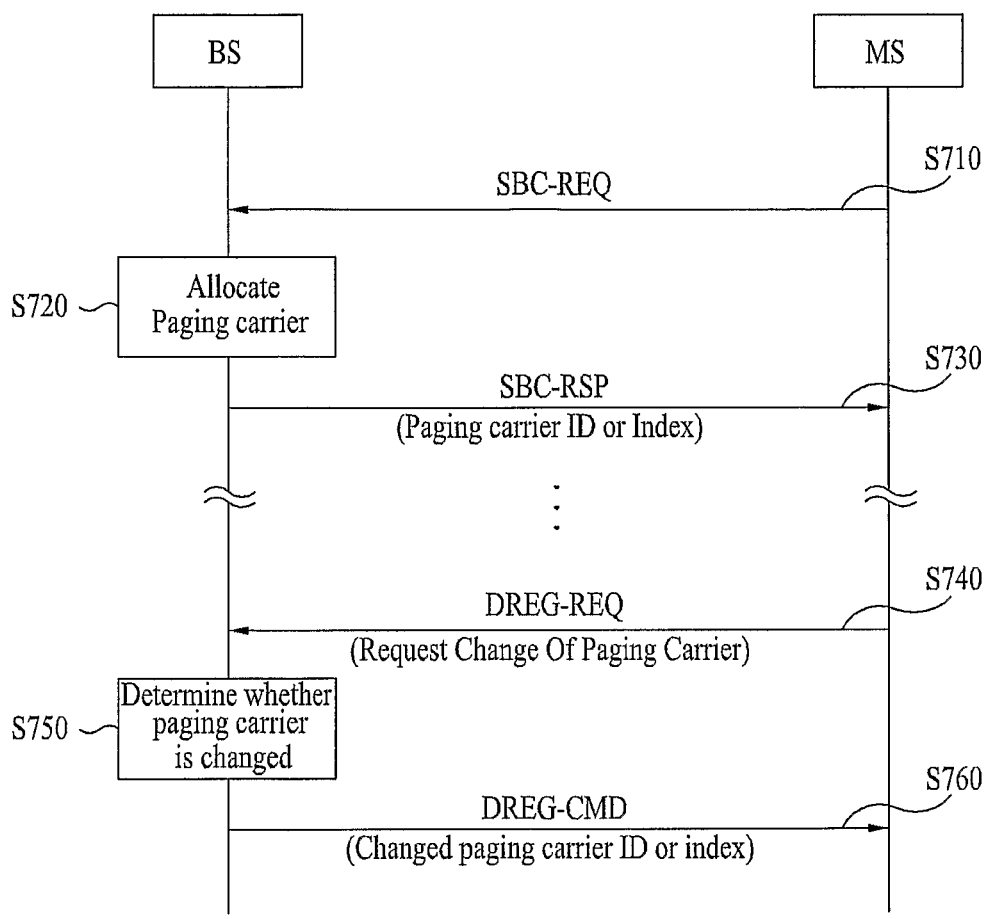
FIG. 7 is a view showing an example of a method of, at a mobile station, requesting the change of a paging carrier according to another embodiment of the present invention.

FIG. 7 is a view showing a method of, at an MS, requesting the change of a paging carrier according to another embodiment of the present invention.

Steps S710 to S730 of FIG. 7 are equal or similar to steps S610 to S630. Accordingly, the description of the above steps refers to FIG. 6.

In FIG. 7, the MS may determine a paging carrier, which desires to be allocated, and inform the BS of the paging carrier. For example, when the MS enters the idle mode, the MS may determine a preferred paging carrier and inform the BS of the preferred paging carrier using a DREG-REQ message (S740).

Table 8 shows an example of the DREG-REQ message format used in step S740.

TABLE 8

| Syntax | Size (bit) | Notes |
|---|---|---|
| MOB_DREG-REQ_Message_format( ) { | — | — |
| ~ | | |
| Paging Carrier ID or Paging Carrier Index (Optional) | | Paging Carrier ID or Index desired to be allocated to the MS |
| Paging Group ID | | Paging Group ID allocated to the MS |
| ~ | | |
| } //End of MOB_DREG-REQ | | |

Figure 8:
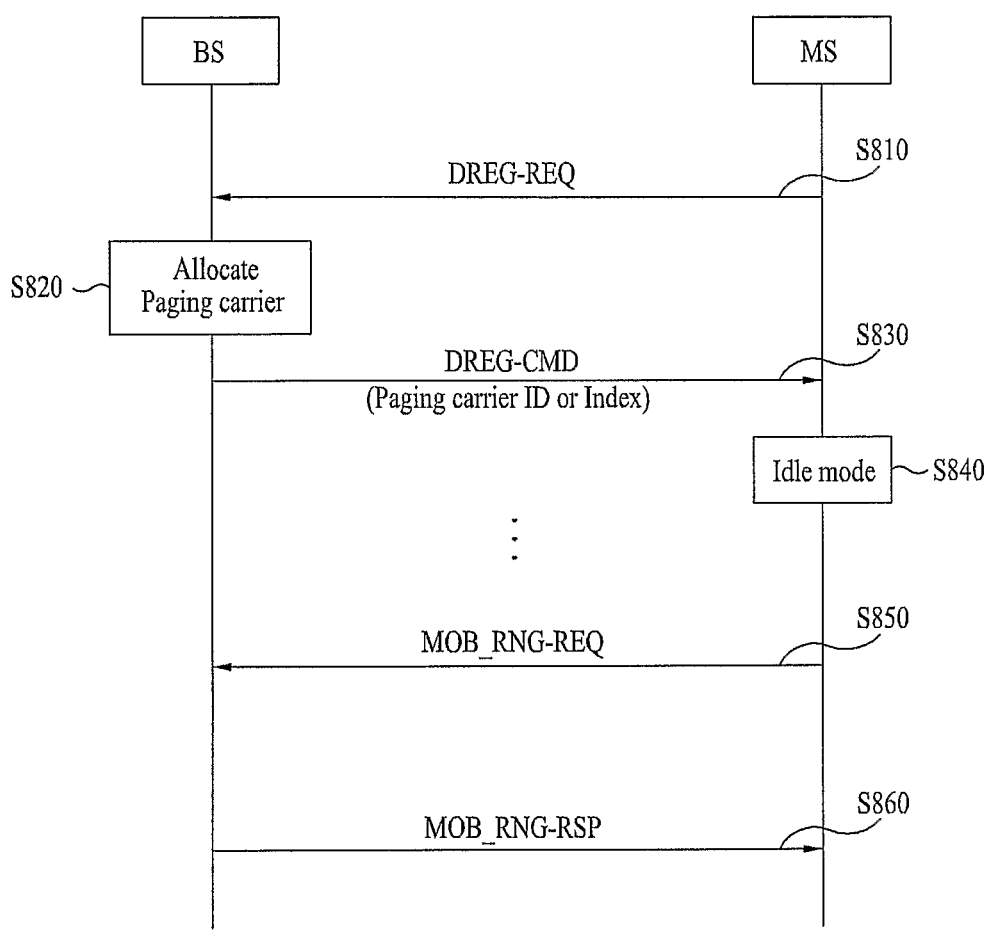
FIG. 8 is a view showing a method of allocating a paging carrier after a mobile station enters an idle mode according to another embodiment of the present invention.

Referring to FIG. 8, the DREG-REQ message may include a paging carrier ID or a paging carrier index indicating the paging carrier desired to be allocated to the MS.

The BS which receives the DREG-REQ message may determine whether the paging carrier is changed according to the request of the MS (S750).

When the paging carrier allocated to the MS is changed, the BS may transmit a DREG-CMD message including the changed paging carrier ID or the changed paging carrier index to the MS (S760).

FIG. 8 is a view showing a method of allocating a paging carrier after an MS enters an idle mode according to another embodiment of the present invention.

Referring to FIG. 8, the MS transmits a DREG-REQ message to a BS in order to enter the idle mode (S810).

The BS may allocate the paging carrier to the MS (S820) and transmit to the MS a DREG-CMD message including a paging carrier ID or a paging carrier index indicating the paging carrier allocated to the MS (S830).

The MS which receives the DREG-CMD message may enter the idle mode and receive a paging message during a paging listen interval through the paging carrier allocated to the MS (S840).

After entering the idle mode, the MS may perform location update using a network (e.g., the BS and/or the paging controller) periodically or if a location update condition is satisfied.

The MS which is in the idle mode may perform location update by various start conditions. For example, the MS may perform timer based location update if a location update timer of the MS, the BS or the paging controller expires. In addition, the MS may perform paging group location update if the paging group to which the MS belongs is changed. In addition, the MS may perform power down location update before a power source is turned off. In addition, the MS may perform location update such as Medium Access Control (MAC) hash skip threshold update. In the embodiments of the present invention, if the MS moves into a paging group region using a paging carrier other than the paging carrier which is currently used by the MS, location update may be performed.

Referring to FIG. 8 again, the MS may move from the paging group using the paging carrier allocated in step S820 to another paging group. In this case, the MS may transmit a ranging request (MOB_RNG-REQ) message to the BS in order to perform location update (S850).

The BS which receives the MOB_RNG-REQ message in step S850 may allocate a new paging carrier to the MS. Accordingly, the BS may transmit a ranging response (MOB_RNG-RSP) message including the paging carrier ID or the paging carrier index of the new paging carrier to the MS (S860).

Table 9 shows an example of the MOB_RNG-REQ message used in step S860.

TABLE 9

| Syntax | Size (bit) | Notes |
|---|---|---|
| MOB_RNG-RSP_Message_format( ) { | — | — |
| ~ | | |
| Paging Carrier ID or Paging Carrier Index | | Paging Carrier ID or Index allocated to the MS |
| Paging Group ID | | Paging Group ID allocated to the MS |
| ~ | | |
| } //End of MOB_RNG-RSP | | |

Referring to Table 9, the MOB_RNG-REQ message may include the ID of the paging carrier newly allocated to the MS or the index of the newly allocated paging carrier.

As another aspect of FIG. 8, if the MS moves to a paging group using a paging carrier other than the paging carrier allocated in step S820, the MS may request the change of the paging carrier to the BS.

In this case, the MS may transmit a ranging request (MOB_RNG-REQ) message including the paging carrier ID or the paging carrier index of its preferred paging carrier to the BS in step S850.

Table 10 shows an example of the MOB_RNG-REQ message format used when the MS requests the change of the paging carrier.

TABLE 10

| Syntax | Size (bit) | Notes |
|---|---|---|
| MOB_RNG-REQ_Message_format( ) { | — | — |
| ~ | | |
| Paging Carrier ID or Paging Carrier Index (Optional) | | Paging Carrier ID or Index desired to be allocated to the MS |
| Paging Group ID | | Paging Group ID allocated to the MS |
| ~ | | |
| } //End of MOB_RNG-REQ | | |

Referring to Table 10, the MOB_RNG-REQ message may include the ID of the paging carrier newly allocated to the MS or the index of the newly allocated paging carrier.

The paging carrier index described with respect to Table 7 to Table 10 and the paging group ID information mapped to the paging carrier may be transmitted to the MS through an additional broadcast message. Examples of such a message may include an NBR-ADV message and an MC-ADV message.

As another aspect of FIG. 8, the MS and the BS may change the paging carrier allocated to the MS using a location update procedure. For example, since the MS does not substantially move immediately after entering the idle mode, the BS allocates a paging carrier for covering a small paging group to the MS. However, if the MS moves at a high speed after a predetermined time elapses, the MS may frequently perform location update. Accordingly, it is preferable that the BS reallocate a paging carrier for covering a large cover group to the MS.

Alternatively, although the BS allocates a paging carrier for covering a large paging group range to the MS when the MS enters the idle mode, the MS may not substantially move or may continuously stay in a specific region after a predetermined time elapses. In this case, it is preferable that the large paging group allocated to the MS be changed to a small paging group. Accordingly, the BS may change the paging carrier to a paging carrier for covering the small paging group and allocate the paging carrier for covering the small paging group or the MS may request the change of the paging carrier.

In this case, the MOB_RNG-RSP message and the MOB_RNG-REQ message described with reference to Table 9 and Table 10 may be used as the MOB_RNG-RSP message and the MOB_RNG-REQ message which are used to perform location update in the MS and the BS.

Figure 9:
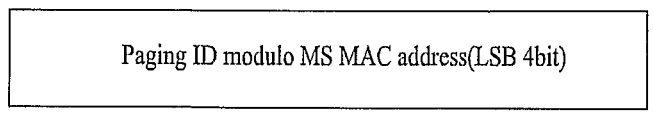
FIG. 9 is a view showing a method of, at a mobile station, implicitly confirming a paging carrier allocated thereto according to another embodiment of the present invention.

FIG. 9 is a view showing a method of, at an MS, implicitly confirming a paging carrier allocated thereto according to another embodiment of the present invention.

Referring to FIG. 9, the MS may confirm the paging carrier allocated thereto using a value acquired by performing a modulo operation of the paging ID allocated by the BS with a Medium Access Control (MAC) address.

In particular, the MS may identify the paging carrier allocated to the MS using a value obtained by performing the modulo operation of a Least Significant Bit (LSB) of the MAC address.

For example, the MS may perform the modulo operation using the LSB 4 bits of the MAC address of the MS. The LSB of the MAC address of the MS which is subjected to the modulo operation may be changed according to the number of carriers used by the BS.

If the number of carriers used by the BS is 16, the MS may perform the modulo operation using the LSB 4 bits so as to determine the paging carrier. In addition, if the number of carriers is 8, the MS may perform the modulo operation using LSB 3 bits so as to determine the paging carrier of the MS.

Next, another method of allocating a paging carrier to an MS will be described as another embodiment of the present invention.

In the present embodiment, a method of efficiently solving a primary carrier configuring problem which may occur if a preferred BS of the MS which operates in the idle mode is changed will be provided. In the present embodiment, a method of previously configuring a primary carrier of the MS (a paging carrier of the idle-mode MS) using a broadcast message (e.g., MOB_NBR-ADV, AAI_NBR-ADV, AAI_D-REG-CMD, AAI_MC-ADV or PGID_information message) is suggested.

Since the MS which is in the idle mode recognizes information about the multiple carriers of a neighbor cell through the broadcast message in a multi-carrier environment, it is possible to prevent power consumption due to additional communication which may occur whenever a preferred BS is changed. Hereinafter, a detailed method will be described.

1. Method of Using Number of Fully Configured Carriers of Neighbor Cell (or Number of Carriers available as Paging Carriers)

The present method refers to a method of informing the MS of the number of fully configured carriers (or the number of carriers available as paging carriers) of a neighbor cell using a message including information about the neighbor cell (e.g., a MOB_NBR-ADV message of IEEE 802.16e, or an AAI_NBR-ADV, AAI_DREG-CMD, AAI_MC-ADV or PGID_information message of IEEE 802.16m). One of the following methods may be used in order to select paging carriers between the MS and the BS using the number of fully configured carriers (or the number of carriers available as paging carriers).

1) Allocation of Paging Carriers Using MS Group ID of Idle-Mode MSs Belonging to the Same BS Paging Group The idle-mode MSs may receive a paging message during a paging listening interval allocated by the paging controller. At this time, since the MSs having the same paging listening interval are implicitly grouped, the paging carriers may be allocated to the MSs having the same paging listening interval using a value such as an MS paging group ID. This value may be provided together with paging information for configuring the paging listening interval when the MSs enter the idle mode, and may be equally used within the same BS paging group once it is allocated to the idle-mode MSs.

In other words, since the MSs always configure and use the same listening interval within the same BS paging group in a single-carrier environment, the MSs have the same MS group ID within the same BS paging group. Similarly, the MSs use one carrier for paging in a multi-carrier environment, a listening interval may be configured using the same method as the single-carrier environment and the same listening interval may be used within the same BS paging group.

In general technology, if it is assumed that a single carrier is used for MS grouping, overhead may occur due to the size of a message when paging notification of all MSs belonging to the BS paging group is transmitted through one paging message. Accordingly, the BS configures different listening intervals with respect to MSs in order to transmit the paging message in a state of being dispersed along a time axis. Therefore, MSs which awake in different listening intervals belong to different MS paging groups.

In general technology, the MSs are informed only of their listening intervals and an MS paging group ID is not explicitly used. However, according to an aspect of the present embodiment, the MS paging group ID is explicitly signaled such that the MSs belonging to different MS paging groups may have different paging carriers using this value.

That is, the idle-mode MSs which are dispersed by the paging controller along the time axis are adequately dispersed using the fully configured carriers of the BS for load balancing of the paging message such that a primary carrier is configured using one carrier after the MSs perform network reentry, thereby preventing load from being concentrated.

Figure 10:
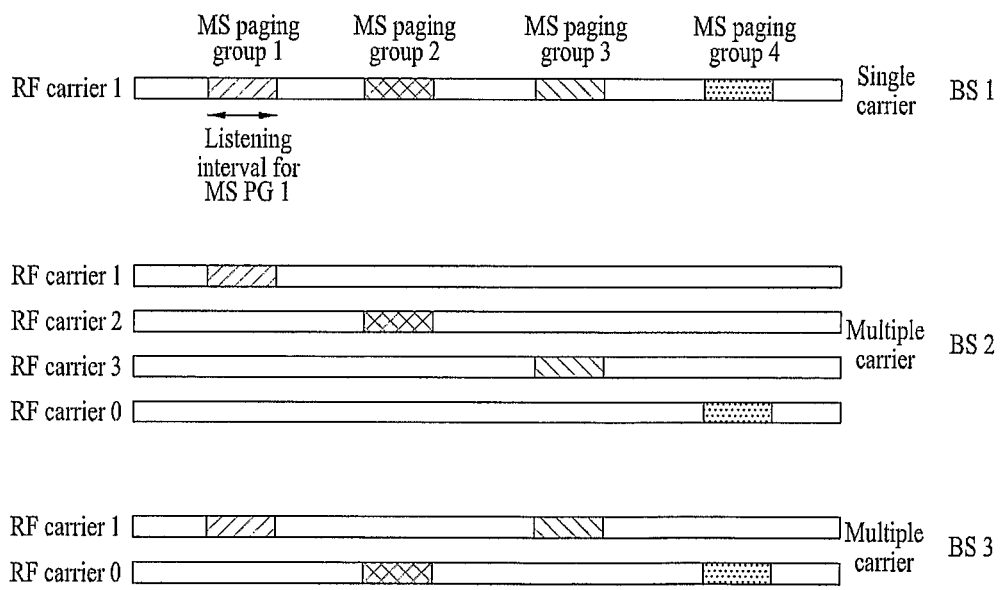
FIG. 10 is a view showing an example of a method of allocating paging carriers in a multi-carrier environment according to another embodiment of the present invention.

The above method is shown in FIG. 10.

FIG. 10 is a view showing an example of a method of allocating paging carriers in a multi-carrier environment according to another embodiment of the present invention.

In FIG. 10, it is assumed that a BS 1 is a BS of a general single-carrier environment, a BS 2 has a total of four RF carriers 1, 2, 3 and 4 as fully configured carriers, and a BS 3 has a total of two RF carriers 1 and 2.

In the single-carrier environment (BS 1), since one carrier is used, paging intervals are dispersed on one carrier along a time axis and a paging message is transmitted. However, in a multi-carrier environment (BS 2 and BS 3) to which the method of allocating the paging carriers according to an aspect of the present embodiment is applied, paging groups may be dispersed on all of the fully configured carriers of the multiple carriers (or the carriers available as the paging carriers).

The MSs may recognize the number of fully configured carriers of the preferred BS (or the number of carriers available as the paging carriers) in advance through neighbor cell information or paging-related messages (e.g, MOB_NBR-ADV message of IEEE 802.16e, AAI_NBR-ADV, AAI_D-REG-CMD, AAI_MC-ADV or PGID information message of IEEE.802.16m), and recognize the indices of paging carriers to be used using the modulo operation using their MS paging group IDs.

The indices of the paging carriers using the modulo operation of the MSs may be calculated using Equation 1.

MS paging group ID % $N$==MS paging carrier's index [Equation 1]

In Equation 1, "N" denotes the number of fully configured carriers of the BS or the number of carriers available as the paging carriers. In addition, "MS paging carrier's index" may be any one of the index of the paging carrier, the index of the fully configured carrier or the index of carrier available as the paging carrier.

Since the MSs recognizes their paging carriers using their MS paging group IDs, the idle-mode MSs can be uniformly dispersed using the respective carriers. Accordingly, during network reentry, the MSs can configure their paging carriers as the primary carriers, and the carrier load can be dispersed without a separate carrier switching procedure. In addition, since a paging message dispersed and transmitted along the time axis is transmitted using one paging carrier according to its MS paging group ID, it is possible to minimize message overhead.

2) Allocation of Paging Carriers using Unique Information of MS

According to another aspect of the present embodiment, if the MS paging group ID is not used, paging carriers for enabling the idle-mode MSs to receive the paging message may be allocated using the unique information of the MSs.

That is, if the listening intervals are arbitrarily configured by the paging controller and the MS paging group ID is not transmitted unlike the above-described aspect of the present embodiment, the MSs may use their unique IDs when selecting the paging carriers. Examples of the unique ID of each of the MSs include a MAC ID, a station ID, a temporary ID, a flow ID, a MAC address hash and the like. The temporary ID is a temporary ID applied to the MS by the paging controller and may be recognized by the MS through a message received from the BS, such as a DREG-CMD message.

The listening intervals may be allocated to the MSs when entering the idle mode and the MSs may configure the carriers to be monitored using the number of fully configured carriers of the BS (or the number of carriers available as all the paging carriers) and their unique IDs whenever a preferred BS is newly configured. In other words, the MSs may receive the paging message through the paging carriers configured according to the number of fully configured carriers (or the number of carriers available as paging carriers) of the preferred BS and their unique IDs during the listening intervals allocated when entering the idle mode.

In addition, the BS transmits the paging message using the listening intervals configured within the BS paging group on all fully configured carriers (or the carriers available as all the paging carriers). That is, the BS configures the carriers monitored by the MSs using the unique IDs of the idle-mode MSs belonging to the BS paging group and the number of fully configured carriers available in its cell and periodically transmits the paging message during the listening intervals of the paging carriers corresponding to the MSs.

At this time, the paging listening intervals of the MSs are implemented such that the overhead and the load of the paging message are appropriately dispersed.

Figure 11:
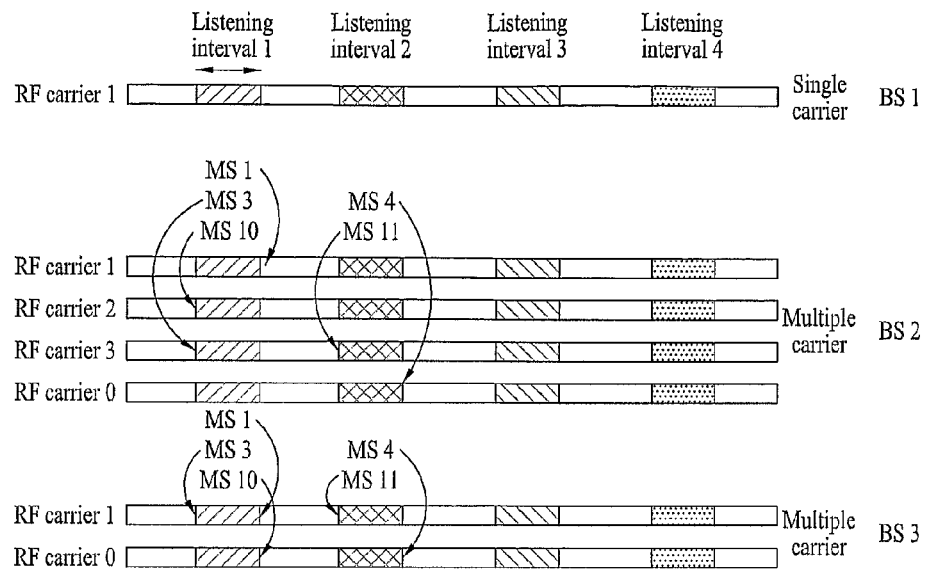
FIG. 11 is a view showing another example of a method of allocating paging carriers in a multi-carrier environment according to another embodiment of the present invention.

An example of the above method is shown in FIG. 11.

FIG. 11 is a view showing another example of a method of allocating paging carriers in a multi-carrier environment according to another embodiment of the present invention.

In FIG. 11, it is assumed that a BS 1 is a BS of a general single-carrier environment, a BS 2 has a total of four RF carriers 1, 2, 3 and 4 as fully configured carriers, and a BS 3 has a total of two RF carriers 1 and 2.

In the single-carrier environment (BS 1), since one carrier is used, paging intervals are dispersed on one carrier along a time axis and a paging message is transmitted. However, in a multi-carrier environment (BS 2 and BS 3) to which the method of allocating the paging carriers according to another aspect of the present embodiment is applied, paging groups may be dispersed on all the fully configured carriers of the multiple carriers (or the carriers available as the paging carriers) in a state of retaining the listening intervals.

The MSs may recognize the number of fully configured carriers of a preferred BS (or the number of carriers available as the paging carriers) in advance through neighbor cell information, and recognize the indices of paging carriers to be used using the modulo operation using their paging group IDs.

The indices of the paging carriers using the modulo operation of the MSs may be calculated using Equation 2.

$$\text{MS ID } \% \ N = \text{MS paging carrier's index} \quad [\text{Equation 2}]$$

In Equation 2, "N" denotes the number of fully configured carriers of the BS or the number of carriers available as the paging carriers. In addition, "MS paging carrier's index" may be any one of the index of the paging carrier, the index of the fully configured carrier or the index of a carrier available as the paging carrier.

Referring to FIG. 11 again, an MS having a unique ID (e.g., a temporary ID) of 3 may determine a carrier index 3 as its paging carrier in the BS 2 and determine a carrier index 1 as its paging carrier in the BS 3.

In addition, in the present embodiment, a message (e.g., a MOB_NBR-ADV message of 16e or an AAI_NBR-ADV, AAI_DREG-CMD, AAI_MC-ADV or PGID info message of 16m) including neighbor cell information enables the idle-mode MSs to analogize the number of carriers available as paging carriers using information about multiple carriers of the neighbor cell such that the paging carriers of a target BS are selected.

3) Allocation of Primary Carrier during Network Reentry

Meanwhile, according to another aspect of the present embodiment, the carrier selection method described using Equation 1 and Equation 2 may be used to determine a primary carrier during network reentry. At this time, one paging carrier is configured per BS regardless of the number of fully configured carriers of the BS. In other words, the BS transmits a paging message to all MSs belonging to its BS paging group through one paging carrier. Instead, each MS may select its primary carrier using any one of Equation 1 and Equation 2 when performing network entry. In this case, Equation 1 and Equation 2 are corrected to Equation 3 and Equation 4.

$$\text{MS paging group ID } \% \ N = \text{MS primary carrier's index} \quad [\text{Equation 3}]$$

Equation 3 shows a method of, at an MS, determining a primary carrier during network reentry using an MS paging group ID when a BS informs the MS of an MS paging group.

$$\text{MS ID } \% \ N = \text{MS primary carrier's index} \quad [\text{Equation 4}]$$

Equation 4 shows a method of, at an MS, determining a primary carrier during network reentry using its unique ID when a BS does not inform the MS of an MS paging group.

Among the above-described methods, a method using Equation 4 will be described with reference to FIG. 12.

Figure 12:
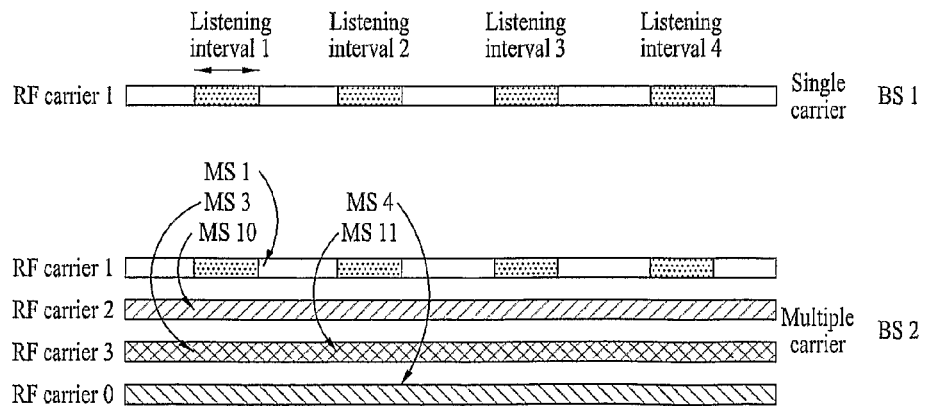
FIG. 12 is a view showing an example of a method of allocating a primary carrier in a multi-carrier environment according to another embodiment of the present invention.

FIG. 12 is a view showing an example of a method of allocating a primary carrier in a multi-carrier environment according to another embodiment of the present invention.

In FIG. 12, it is assumed that a BS 1 is a BS in a general single-carrier environment and a BS 2 has a total of four RF carriers 1, 2, 3 and 4 as fully configured carriers.

In the single-carrier environment (BS 1), since one carrier is used, paging intervals are dispersed on one carrier along a time axis and a paging message is transmitted. MSs configure the same carrier as a paging carrier as a primary carrier during network reentry. A multi-carrier environment (BS 2) is equal to the BS 1 in that one paging carrier is used. However, when the MSs select their primary carriers during network reentry, the MSs perform a modulo operation using their unique IDs. Accordingly, the primary carriers of the MSs which reenter the network may be dispersed in the fully configured carriers of the multiple carriers. For example, in an MS having a unique identifier (e.g., a temporary ID) of 11, since 11%4=3 according to Equation 4, the MS selects a carrier index 3 as its primary carrier.

2. Definition of Paging Carrier

The paging carriers used in the present embodiment may be configured between an MS and a BS using any one of the above methods. If the paging carriers configured when the MS enters the idle mode are configured as the paging carrier regardless of whether they are equal to primary carriers in the normal/active mode, it is preferable that the basic operation performed in the primary carriers be performed in the paging carriers. If the paging carriers are not the primary carriers, it is preferable that carrier switching to the paging carriers be performed automatically. In addition, even when preferred BSs of idle-mode MSs are changed, it is preferable that newly configured paging carriers perform the basic roles (e.g., an operation related to message transmission or system information transmission) of the primary carriers of the MSs.

3. Definition of Paging Carrier's Index

The paging carriers used in the present embodiment may be fully/partially configured carriers, fully configured carriers or partially configured carriers available in an arbitrary cell. As described above, it is preferable that the paging carriers are configured by the fully configured carriers.

In a general IEEE 802.16m system, information about multiple carriers available in an arbitrary cell is transmitted through a broadcast message such as an AAI_NBR-ADV message or an AAI_MC-ADV message. Such multiple carriers have respective unique physical carrier indices. In the present embodiment, paging carriers used in an arbitrary MS are analogized using the number of fully configured carriers or the number of carriers available as paging carriers.

As described above, in the present embodiment, an arbitrary MS selects paging carrier's indices by performing a modulo operation using its unique ID such as a paging group ID or an MS ID. Accordingly, in the present embodiment, if only some of fully configured carriers or all carriers are used as the paging carriers, a method of mapping the paging carrier indices in addition to the physical carrier indices needs to be defined.

First, in the paging carriers defined in the present embodiment, it is indicated that the carriers are available as the paging carriers by newly defining a "paging carrier indication" field together with information about carriers in a message (i.e., AAI_NBR-ADV or AAI_MC-ADV) for transmitting information about the multiple carriers transmitted by the BS. If the paging carrier indication field of a specific carrier is set to "1", it may be indicated that the carrier is available as the paging carrier.

Accordingly, in the present embodiment, the BS further signals indication (paging carrier indication field) indicating whether the carrier is available as the paging carrier in a message (i.e., AAI_NBR-ADV or AAI_MC-ADV) for transmitting configuration information of all carriers (i.e., available carriers) belonging to its cell and unique physical carrier indices of all carriers within the cell.

In addition, the BS explicitly transmits the information indicating whether the carrier is available as the paging carrier together with the number N of paging carriers such that the MS computes its paging carrier index using the number N of paging carriers. Alternatively, the MS may implicitly analogize the number N of paging carriers using only the paging carrier indication field of the message including the carrier information of the BS.

Such information (number of paging carriers or paging carrier indication) may be explicitly signaled in the message through which paging related information such as a PGID_information message or an AAI_DREG-CMD message which is one of additional system information messages is transmitted.

Hereinafter, a detailed method of mapping the paging carrier indices according to the present embodiment will be described.

1) Method of Implicitly Mapping Paging Carrier Indices

The paging carrier indices may be sequentially and implicitly allocated to 0 to (N−1) in descending order (or ascending order) of the physical carrier indices of the corresponding carriers among carriers in which a "paging carrier indication" field is set to 1 within a message (e.g., AAI-NBR-ADV or AAI_MC-ADV) through which information about available carriers within a cell is transmitted.

For example, if it is indicated that carriers having physical carrier indices of 0, 3, 6 and 7 are paging carriers (that is, the paging carrier indication field is set to "1"), the BS and the MS may implicitly analogize the paging carrier indices of the carriers as follows and the number N of paging carriers of the cell is 4.

In detail, in ascending order, the paging carrier index of a carrier having a physical carrier index of 0 (paging carrier indication is set to 1) may become 0 and the paging carrier index of a carrier having a physical carrier index of 3 (paging carrier indication is set to 1) may become 1. In addition, the paging carrier index of a carrier having a physical carrier index of 6 (paging carrier indication is set to 1) may become 2 and the paging carrier index of a carrier having a physical carrier index of 7 (paging carrier indication is set to 1) may become 3.

In contrast, in descending order, the paging carrier index of a carrier having a physical carrier index of 0 (paging carrier indication is set to 1) may become 3 and the paging carrier index of a carrier having a physical carrier index of 3 (paging carrier indication is set to 1) may become 2. In addition, the paging carrier index of a carrier having a physical carrier index of 6 (paging carrier indication is set to 1) may become 1 and the paging carrier index of a carrier having a physical carrier index of 7 (paging carrier indication is set to 1) may become 0.

2) Method of Explicitly Signaling Paging Carrier Index through Broadcast Message for Transmitting All Carrier Information Paging carrier indices may be explicitly allocated to an MS through a message (e.g., AAI_NBR-ADV or AAI_MC-ADV) for transmitting information about available carriers within a cell. At this time, if a paging carrier indication field is defined together, a paging carrier index may be further transmitted only when the paging carrier indication field is set to 1 or the paging carrier index and the paging carrier indication may always be transmitted together.

This will be described with reference to Tables 11 and 12.

Table 11 shows an example of an AAI_NBR-ADV message format according to another embodiment of the present invention.

TABLE 11

| Field | Size (bit) | Description |
|---|---|---|
| AAI_NBR-ADV_Message_format( ) { | — | — |
|     Management Message Type = NN | 8 | — |
|     Change Count | 8 | NBR-ADV change count |
|     Number of cell types | 2 | — |
|     Cell type in this message | 2 | — |
|     Total Fragmentation | TBD | Indicates the total number of fragmentations |
|     Fragmentation Index | TBD | Indicates the current fragmentation index. |
|     Starting BS Index | 8 | BS index is calculated from this parameter. |
|     FA information | 8 | — |
|     BW information | 8 | — |
|     Duplex mode | 2 | — |
|     BS number (M) | TBD | Total number of BSs to be included in this segment |
|     SFH_encoding_format | 2 | 0b00: full Subpkt information<br>0b01: delta encoding with TBD format<br>0b10: no SFH included<br>For macrocell ABS, the bitmap shall not be 0b10. |
|     if (M != 0) { | | |
|         for (i=0; i<M; i++) { | — | — |
|             BSID | 48 | — |
|             A-PREAMBLE info | TBD | — |
|             S-SFH change count | 4 | The change count of this BS's S-SFH IE |
|             Number of Paging carriers | TBD | Indicates the number of paging carriers available in the BS |
|             If( SFH_encoding_format == 00) { | — | — |

TABLE 11-continued

| Field | Size (bit) | Description |
|---|---|---|
|     Control_bitmap | 3 | Each bit maps to one SFH subpacket or extended broadcast information. For macrocell ABS, the bitmap shall be 111. |
|     If( Control_bitmap[0] ==1 ) { | — | — |
|         SFH Subpkt 1 | TBD | — |
|     } | — | — |
|     If( Control_bitmap[1] ==1 ) { | — | — |
|         SFH Subpkt2 | TBD | — |
|     } | — | — |
|     If( Control_bitmap[2] ==1 ) { | — | — |
|         SFH Subpkt3 | TBD | — |
|     } | — | — |
| } | — | — |
|     if (SFH_encoding_format == 0 1) { | — | — |
|         Delta information | — | Delta encoding, w.r.t. the serving BS |
|     } | — | — |
| } | — | — |
| } | — | — |
| } | — | — |

Referring to Table 11, the MS can recognize the number N of paging carriers available in the BS through a "number of paging carriers" field. If information about all available carriers belonging to each NBR ABS is transmitted through an NBR-ADV message, the paging carrier indications of the carriers and, if necessary, the paging carrier indices may be transmitted together with configuration information of the carriers.

Next, Table 12 shows an example of an AAI_MC-ADV message format according to another embodiment of the present invention.

TABLE 12

| Field | Size (bit) | Description |
|---|---|---|
| Number of Carrier groups | 4 | Groups of contiguous carriers |
| Uniformity Flag | 1 | All carriers have the same protocol version, Carrier type, Duplexing mode and Transmit power. |
| Physical carrier index of current carrier | 6 | The carrier that the ABS broadcasts this message. |
| Number of paging carriers | TBD | Number of paging carriers available in the BS (which may be defined if explicit signaling is necessary) |
|     For (i=1; i<=Number of Carrier Groups; i++){ | — | — |
|         Multi-carrier configuration index | 6 | Index associated with Table 648 |
|         Start frequency assignment index | 6 | Frequency assignment index of the first carrier in carrier group i. |
|         Number of carriers | 4 | Number of carriers in carrier group i. |
|         For(j=i; j<=Number of carriers; j++){ | | |
|             Physical carrier index | 6 | — |
|             Preamble index | 6 | — |
|             Paging carrier indication | 1 | Indicates whether the carrier is available as the paging carrier 0: not available as paging carrier 1: available as paging carrier |

TABLE 12-continued

| Field | Size (bit) | Description |
|---|---|---|
| If (paging carrier indication ==1){ paging carrier index } | 6 | (defined if index of the paging carrier is transmitted by explicit signaling) The paging carrier index of the carrier is allocated if the carrier is available as the paging carrier |
| If(Uniformity flag == 1 \|\| (i ==1 && j==1)){ | | — |
|     Protocol version | 2 | 00: IEEE 802.16-2009 only mode<br>01: IEEE 802.16m and IEEE 802.16-2009 mixed mode<br>10: IEEE 802.16m only mode<br>11: reserved |
|     Carrier type | 1 | 0: for fully configured<br>1: for partially configured |
|     Duplexing mode | 1 | 0: for TDD<br>1: for FDD |
|     Transmit power | 6 | Maximum transmit power level |
| } } } | — | — |

Referring to Table 12, a "number of paging carriers" field may be included in the AAI_MC-ADV message such that the MS is informed of the number N of carriers available as the paging carriers. In addition, the AAI_MC-ADV message may include a "paging carrier indication" field indicating whether the carrier is available as the paging carrier and a "paging carrier index" field indicating the paging carrier index of the carrier if the "paging carrier indication" field of the carrier is 1.

3) Method of Explicitly Signaling Paging Carrier Index through Message for Transmitting Paging Related Information The BS may explicitly signal mapping of the paging carrier indices and the physical carrier indices of the paging carriers to the MS together with the number N of paging carriers used in the cell through the message (e.g., a PGID_information message or an AAI_DREG-CMD message) for paging information transmission.

This will be described with reference to Tables 13 and 14.

Table 13 shows an example of a PGID_information message format according to another embodiment of the present invention.

TABLE 13

| Name | Value |
|---|---|
| Num_PGIDs | Number of paging groups in the ABS |
| PGID | Identifier of paging group (0~2^16) |
| Number of Paging carriers | Number of paging carriers in the BS |
| m | Time domain hash parameter (1~4) used to determine the frame number of a superframe for paging message transmission of an idle mode AMS. |
| For(i=0; i<Num of paging carriers; i++){<br>    Physical carrier index [paging carrier index]<br>} | Physical carrier indices of carriers corresponding to paging carriers are explicitly signaled. Paging carrier indices may be allocated in order of physical carrier indices listed herein [or paging carrier indices regarding to physical carrier indices may be further explicitly transmitted]. |

Referring to Table 13, a "number of paging carriers" field may be included in the PGID_information message such that the MS is informed of the number N of carriers available as the paging carriers. In addition, the PGID information message may include a physical carrier index field for explicitly signaling the physical carrier indices of the carriers corresponding to the paging carriers and a field indicating the paging carrier indices regarding to the physical carrier indices.

Table 14 shows an example of the AAI_DREG-CMD message format according to another embodiment of the present invention.

TABLE 14

| Syntax | Size (bit) | Notes |
|---|---|---|
| MOB_DREG-CMD_Message_format( ) { | — | — |
| ~ | | |
| Number of Paging carriers | | Number of paging carriers in the BS |
| For(i=0; i<Num of paging carriers; i++){<br>    Physical carrier index [paging carrier index]<br>} | | Physical carrier indices of the carriers corresponding to the paging carriers may be explicitly signaled by the number of paging carriers [or paging carrier indices regarding to the physical carrier indices may be further explicitly transmitted]. |
| ~ | | |
| } //End of MOB_DREG-CMD | | |

Referring to Table 14, a "number of paging carriers" field may be included in the AAI_DREG-CMD message such that the MS is informed of the number N of carriers available as the paging carriers. In addition, the AAI_DREG-CMD message may include a physical carrier index field for explicitly signaling the physical carrier indices of the carriers corresponding to the paging carriers and a field indicating the paging carrier indices regarding to the physical carrier indices. Furthermore, the AAI_DREG-CMD message may include information such as paging information, paging cycle, paging offset, paging group ID, paging controller ID, idle mode retention information and temporary identifier.

As other embodiments of the present invention, an MS and a BS (FBS and MBS) which may perform the above-described embodiments of the present invention will be described.

The MS may function as a transmitter in uplink and function as a receiver in downlink. The BS may function as a receiver in uplink and function as a transmitter in downlink. That is, the MS and the BS may include a transmitter and a receiver for transmission of information or data.

The transmitter and the receiver may include a processor, a module, a portion and/or means for performing the embodiments of the present invention. In particular, the transmitter and the receiver may include a module (means) for encrypting a message, a module for decrypting an encrypted message, and an antenna for transmitting or receiving a message. An example of the transmitter and the receiver will be described with reference to FIG. 13.

Figure 13:
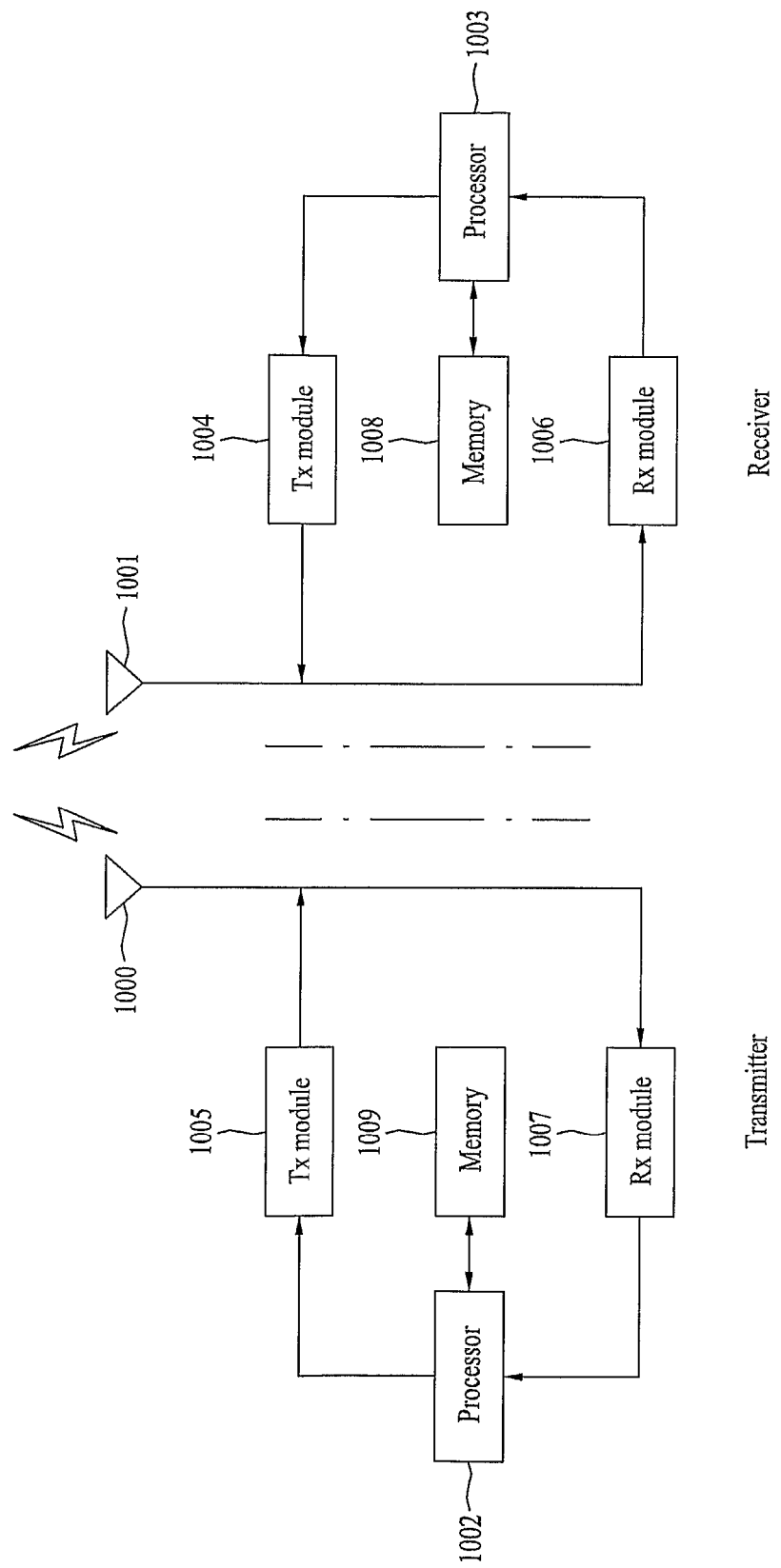
FIG. 13 is a block diagram showing an example of the structures of a transmitter and a receiver according to another embodiment of the present invention.

FIG. 13 is a block diagram showing an example of the structures of a transmitter and a receiver according to another embodiment of the present invention.

Referring to FIG. 13, a left side shows the structure of the transmitter and a right side shows the structure of the receiver. The transmitter and the receiver may include antennas 1000 and 1001, processors 1002 and 1003, transmission (Tx) modules 1004 and 1005, reception (Rx) modules 1006 and 1007, and memories 1008 and 1009, respectively. These components may perform corresponding functions. Hereinafter, the components will be described in more detail.

The antennas 1000 and 1001 include a Tx antenna for transmitting signals generated by the Tx modules 1004 and 1005 and an Rx antenna for receiving and transmitting radio signals to the Rx modules 1006 and 1007. The number of antennas may be two or more if a Multi-Input Multi-Output (MIMO) function is supported.

The processors 1002 and 1003 generally control the overall operations of the transmitter and the receiver. In particular, a controller function for performing the above-described embodiments of the present invention, a MAC frame variable control function according to service characteristics and transmission environment, a handover function and an authentication and encryption function may be performed.

In particular, the processor of the MS described in the embodiments of the present invention may generate a message such that paging carriers are allocated by the BS or allocated paging carriers are changed, and transmit the message to the BS.

For example, if the MS according to one embodiment of the present invention first accesses a certain BS, a processor according to one example of the present invention may transmit a basic capability request message to the BS through a Tx unit so as to negotiate basic capability with the BS, and generate and transmit a registration request message if the MS desires registration in the BS.

As another example, in order to change the paging carriers allocated by the BS when the MS transitions to the idle mode, a processor according to one example of the present invention may generate and transmit a deregistration request message for enabling the MS to enter the idle mode to the BS. Accordingly, the BS may retain or change the paging carriers allocated previously. Alternatively, the processor may determine paging carriers to be allocated to the MS and transmit a message including the identifiers or the indices of the determined paging carriers to the BS.

Meanwhile, the processor of the BS may allocate paging channels to predetermined carriers of multiple carriers including one or more carriers so as to generate paging carriers and allocate suitable paging carriers according to mobility of the MS.

In detail, the processor of the BS according to one embodiment of the present invention may transmit a message including allocation information of paging carriers including the paging carrier identifiers or indices to the MS if the basic capability request message or the registration request message is received from the MS. Alternatively, if the MS transmits the request for changing the allocated paging carriers in order to enter the idle mode, the processor of the BS may determine whether the allocated paging carriers are changed and allocate the paging carriers to the MS.

The Tx modules 1004 and 1005 may be scheduled by the processors 1002 and 1003 so as to perform predetermined coding and modulation with respect to data to be transmitted and to send the data to the antennas 1000 and 1001. The Tx modules and the antennas may be collectively represented by Tx units for transmitting radio signals, without being separated as shown in FIG. 13.

The Rx modules 1006 and 1007 may perform decoding and demodulation of the radio signals received through the antennas 1000 and 1001 and restore and send original data to the processors 1002 and 1003. The Rx modules and the antennas may be collectively represented by Rx units for receiving radio signals, without being separated as shown in FIG. 13.

The memories 1008 and 1009 may store programs for processing and controlling the processors 1002 and 1003 and perform a function for temporarily storing input/output data (uplink (UL) grant allocated from the BS, in the case of the MS), system information, STID, FID, and an operation time. In addition, the memories 1008 and 1009 may include at least one of storage mediums such as a flash memory type; hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

Meanwhile, the BS may perform a controller function for performing the above-described embodiments of the present invention, an Orthogonal Frequency Division Multiple Access (OFDMA) packet scheduling, Time Division Duplex (TDD) packet scheduling and channel multiplexing function, a MAC frame variable control function according to service characteristics and transmission environment, a high-speed traffic real-time control function, a handover function, an authentication and encryption function, a packet modulation/demodulation function for data transmission, a high-speed packet channel coding function and a real-time modem control function using at least one of the above-described modules, or further include separate means, modules or portions for performing such a function.

MODE FOR INVENTION

Various embodiments have been described in the best mode for carrying out the invention.

INDUSTRIAL APPLICABILITY

The embodiments of the present invention are applicable to various radio access systems. Examples of the various radio access systems include a $3^{rd}$ Generation Partnership Project (3GPP) system, a 3GPP2 system and/or Institute of Electrical and Electronic Engineers 802 (IEEE802.xx) system. The embodiments of the present invention are applicable to the various radio access systems and all technical fields using the various radio access systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of indicating a paging carrier in a radio access system supporting multi-carrier, the method comprising:
   allocating, at a base station, an unique identifier for a first mobile station, the unique identifier identifying the first mobile station during an idle mode operation;
   transmitting a first message including indication information to mobile stations including the first mobile station through at least one carrier, wherein each bit of the indication information explicitly indicates whether a corresponding one of the at least one carrier is a candidate carrier which can carry a second message for paging during the idle mode operation, wherein a specific carrier, which actually carries the second message to the first mobile station, among at least one candidate carrier, is implicitly identified by using the unique identifier without explicit signaling on the specific carrier; and
   transmitting the second message through the identified specific carrier.

2. The method according to claim 1, wherein the indication information comprises a paging carrier indication field set per each of the at least one carrier.

3. The method according to claim 1, wherein the first message and the second message are broadcast from the base station.

4. The method according to claim 3, wherein the first message comprises a multi-carrier advertisement (AAI-MC-ADV) message, a paging identifier information (PGID-Info) message, and a neighbor advertisement (AAI-NBR-ADV) message, and wherein the second message is a paging advertisement (AAI-PAG-ADV) message.

5. A method of indicating a paging carrier in a radio access system supporting multi-carrier, the method comprising:
   receiving, at a mobile station, an unique identifier for identifying the mobile station during an idle mode operation;
   receiving a first message including indication information through at least one carrier, wherein each bit of the indication information explicitly indicates whether a corresponding one of the at least one carrier is a candidate carrier which can carry a second message for paging during the idle mode operation;
   implicitly identifying a specific carrier, which actually carries the second message to the mobile station, among at least one candidate carrier, using the unique identifier without explicit signaling on the specific carrier; and
   receiving the second message through the identified specific carrier.

6. The method according to claim 5, wherein the indication information comprises a paging carrier indication field set per each of the at least one carrier.

7. The method according to claim 5, wherein the first message comprises a multi-carrier advertisement (AAI-MC-ADV) message, a paging identifier information (PGID-Info) message, and a neighbor advertisement (AAI-NBR-ADV) message, and wherein the second message is a paging advertisement (AAI-PAG-ADV) message.

8. The method according to claim 5, wherein the mobile station determines an index of the specific carrier by using the following equation:

$$\text{unique index of the specific carrier} = (\text{the identifier}) \bmod N, \quad \text{Equation}$$

wherein N is the number of the at least one candidate carrier based on the indication information.

9. A mobile station operating in a radio access system supporting multi-carrier, the mobile station comprising:
   an antenna configured to transmit or receive a radio signal externally; and
   a processor connected to the antenna and configured to:
      obtain an unique identifier for uniquely identifying the mobile station during an idle mode operation;
      receive a first message including indication information through at least one carrier, each bit of the indication information explicitly indicates whether a corresponding one of the at least one carrier is a candidate carrier which can carry a second message for paging during the idle mode operation;
      implicitly identify a specific carrier, which actually carriers the second message to the mobile station, among at least one candidate carrier, using unique the identifier without explicit signaling on the specific carrier; and
      receive the second message through the identified specific carrier.

10. The mobile station according to claim 9, wherein the indication information comprises a paging carrier indication field set per each of the at least one carrier.

11. The mobile station according to claim 9, wherein the first message comprises a multi-carrier advertisement (AAI-MC-ADV) message, a paging identifier information (PGID-Info) message, and a neighbor advertisement (AAI-NBR-ADV) message, and wherein the second message is a paging advertisement (AAI-PAG-ADV) message.

12. The mobile station according to claim 9, wherein the processor determines an index of the specific carrier by using the following equation:

$$\text{unique index of the specific carrier} = (\text{the identifier}) \bmod N, \quad \text{Equation}$$

wherein N is the number of the at least one candidate carrier based on the indication information.

* * * * *